US009529659B2

(12) United States Patent
Ishiou

(10) Patent No.: US 9,529,659 B2
(45) Date of Patent: *Dec. 27, 2016

(54) FAULT DETECTION APPARATUS, A FAULT DETECTION METHOD AND A PROGRAM RECORDING MEDIUM

(71) Applicant: NEC Corporation, Tokyo (JP)

(72) Inventor: Ken Ishiou, Tokyo (JP)

(73) Assignee: NEC Corporation, Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 14/531,653

(22) Filed: Nov. 3, 2014

(65) Prior Publication Data

US 2015/0127987 A1 May 7, 2015

Related U.S. Application Data

(63) Continuation of application No. 13/376,582, filed as application No. PCT/JP2011/063426 on Jun. 6, 2011, now Pat. No. 8,880,946.

(30) Foreign Application Priority Data

Jun. 7, 2010 (JP) .................................. 2010-129842

(51) Int. Cl.
*G06F 11/00* (2006.01)
*G06F 11/07* (2006.01)
*H04L 12/24* (2006.01)

(52) U.S. Cl.
CPC ......... *G06F 11/079* (2013.01); *G06F 11/0751* (2013.01); *H04L 41/0631* (2013.01); *H04L 41/147* (2013.01)

(58) Field of Classification Search
CPC G06F 11/0751; G06F 11/079; H04L 41/0631; H04L 41/147
See application file for complete search history.

(56) References Cited

U.S. PATENT DOCUMENTS 7,318,178 B2   1/2008  Steinberg
8,880,946 B2 * 11/2014  Ishiou ................ G06F 11/0751
                                                        714/26

(Continued)

FOREIGN PATENT DOCUMENTS

EP   2 330 510 A    8/2011
JP   2008-146591 A  6/2008

(Continued)

OTHER PUBLICATIONS

U.S.P.T.O. Notice of Allowance dated Jun. 30, 2014.

(Continued)

*Primary Examiner* — Marc Duncan
(74) *Attorney, Agent, or Firm* — McGinn IP Law Group, PLLC

(57) ABSTRACT

A fault detection apparatus includes a storage unit which stores correlation destruction set information which includes one or more correlations between different types of performance values among a plurality of types of performance values of a system, and a comparison unit which detects a set of common correlations between said one or more correlations included in said correlation destruction set information and one or more correlations on each of which a correlation destruction is detected for inputted performance values.

9 Claims, 24 Drawing Sheets

(56) References Cited

U.S. PATENT DOCUMENTS

| | | | |
|---|---|---|---|
| 8,959,401 B2* | 2/2015 | Kato | G06Q 10/02 |
| | | | 714/47.3 |
| 2002/0091972 A1 | 7/2002 | Harris et al. | |
| 2008/0133288 A1 | 6/2008 | Thibaux et al. | |
| 2008/0198950 A1 | 8/2008 | Suyama | |
| 2009/0049338 A1 | 2/2009 | Unnikrishnan et al. | |
| 2009/0216624 A1* | 8/2009 | Kato | G06F 11/3409 |
| | | | 705/7.38 |
| 2009/0217099 A1 | 8/2009 | Kato | |
| 2010/0205483 A1 | 8/2010 | Ishiou | |
| 2011/0161743 A1 | 6/2011 | Kato | |
| 2011/0225462 A1 | 9/2011 | Kato | |
| 2012/0192014 A1* | 7/2012 | Kato | G06F 11/3409 |
| | | | 714/47.1 |
| 2013/0055037 A1* | 2/2013 | Nonogaki | G06F 11/0754 |
| | | | 714/48 |
| 2013/0159778 A1* | 6/2013 | Yabuki | G06F 11/0751 |
| | | | 714/37 |
| 2014/0325276 A1* | 10/2014 | Yabuki | G06F 11/0754 |
| | | | 714/26 |
| 2014/0365829 A1* | 12/2014 | Higuchi | G06F 11/34 |
| | | | 714/37 |
| 2015/0006960 A1* | 1/2015 | Yabuki | G06F 11/0751 |
| | | | 714/37 |
| 2015/0026521 A1* | 1/2015 | Yabuki | G06F 11/079 |
| | | | 714/37 |
| 2015/0046123 A1* | 2/2015 | Kato | G06F 11/079 |
| | | | 702/183 |
| 2015/0363250 A1* | 12/2015 | Yabuki | G05B 23/0254 |
| | | | 714/37 |
| 2015/0378806 A1* | 12/2015 | Natsumeda | G06F 11/3447 |
| | | | 714/37 |

FOREIGN PATENT DOCUMENTS

| | | |
|---|---|---|
| JP | 2009-199533 A | 9/2009 |
| JP | 2009-199534 A | 9/2009 |
| WO | WO 2010/032701 A1 | 3/2010 |
| WO | WO 2010/044797 A1 | 4/2010 |

OTHER PUBLICATIONS

U.S.P.T.O. Office Action dated Dec. 16, 2013.
U.S.P.T.O. Office Action dated Mar. 28, 2014.
English Translation of form PCT/ISA/237 in International Application No. PCT/JP2011/063426.
Extended European Search Report dated Jul. 9, 2015.
European Communication Pursuant to Article 94(3) EPC dated Oct. 26, 2016.
Schwarz J: "Correlation coefficients according to Bravais-Pearson, Spearman, and Kendall", Laboratory Automation and Information Management, Elsevier BV, NL, vol. 5, No. 3, May 1, 1987, pp. 114-126, XP008181714, ISSN: 0889-8308.

* cited by examiner

COMMONALITY: 5/7=71.4%

| DATE AND TIME | PERFORMANCE INFORMATION | | | | |
|---|---|---|---|---|---|
| | A.CPU | A.MEM | B.CPU | B.MEM | ... |
| 2010/4/5 17:25 | 12 | 80 | 33 | 41 | ... |
| 2010/4/5 17:26 | 15 | 79 | 32 | 46 | ... |
| 2010/4/5 17:27 | 34 | 51 | 32 | 54 | ... |
| 2010/4/5 17:28 | 63 | 51 | 35 | 60 | ... |
| ... | ... | ... | ... | ... | ... |
| 2010/4/5 8:31 | 20 | 79 | 90 | 20 | ... |

Fig.21

| INPUT | OUTPUT | COEFFICIENT A | COEFFICIENT B | WEIGHT w | VALIDITY | ... |
|---|---|---|---|---|---|---|
| A.CPU | A.MEM | −0.6 | 100 | 0.88 | ◯ | ... |
| ... | ... | ... | ... | ... | ... | ... |
| C.CPU | C.MEM | −0.3 | 100 | 0.63 | ◯ | ... |
| B.CPU | B.MEM | 2.0 | −10 | 0.51 | ◯ | ... |
| ... | ... | ... | ... | ... | ... | ... |

932

FAULT DETECTION APPARATUS, A FAULT DETECTION METHOD AND A PROGRAM RECORDING MEDIUM

The present application is a Continuation application of U.S. patent application Ser. No. 13/376,582, filed on Sep. 6, 2011, which is based on Japanese Patent Application No. 2010-129842 filed on Jun. 7, 2010, the entire contents of which are hereby incorporated by reference.

TECHNICAL FIELD

Background Art

In large scale information systems such as business information systems and IDC (Internet Data Center) systems, in accordance with an increase in importance of information and communication services such as web services and business services as social infrastructures, computer systems providing these services are required to keep operating steadily. Operations management of such computer systems is usually performed manually by an administrator. As the systems have become large-scaled and complicated, a load of the administrator has increased tremendously, and a service suspension due to misjudgment or erroneous operation has become more possible to occur.

For this reason, there have been provided integrated fault cause extraction system which monitors and controls, in a unified manner, the operating states of hardware and software included in the above-mentioned systems. In the integrated fault cause extraction system, information on the operating states of hardware and software, in a plurality of computer systems which are managed by the integrated systems, are acquired and outputted to a fault cause extraction apparatus connected to the systems. Means to distinguish a fault of the managed system include the one with setting a threshold value for operating information in advance, and the one with evaluating a deviation of the operating information from its average value.

For example, in the fault cause extraction apparatus of the fault cause extraction system, threshold values are set for individual pieces of performance information and a fault is detected by finding the individual pieces of performance information exceeding the respective threshold values. The fault cause extraction apparatus sets an value indicating abnormality in advance as a threshold value, detects abnormality of individual elements and reports it to an administrator.

When detection of abnormality is reported, the administrator needs to identify a cause of the abnormality occurrence in order to settle it. A typical cause of the abnormality occurrence is, for example, CPU overload, insufficient memory capacity or network overload. In order to identify the cause of the abnormality occurrence, it is required to identify a computer which is likely to be related to the abnormality, and then to investigate its system logs and parameters. This operation requires each administrator to have a high degree of knowledge or know-how, and to spend much time and effort.

Due to this, the integrated fault cause extraction systems provide the administrator with the support for countermeasures against the abnormality, by performing correlation analysis on combinations of operating states and so on automatically, based on event data (state notification) acquired from a plurality of equipments, and estimating problems or causes from a wider standpoint and then notifying the administrators of them. In particular, for ensuring reliability in long-term continual operation of the services, it is required not only to take measures against the abnormalities which have already occurred but also to extract an element which is a possible cause of future abnormalities, even if the abnormalities have not occurred clearly at present, and then to take measures such as equipment reinforcement in a planned way.

Such fault cause extraction systems, or the technologies related to correlation analysis and applicable in the systems, have been described, for example, in each of the patent literature shown below. A technology disclosed in patent literature 1 generates a correlation model by deriving a transform function with regard to time series of the values of two arbitrary performance information (performance values) in normal state, regarding one series as an input and the other as an output. And the technology compares the performance values according to the transform function of the correlation model with the performance information acquire at another time, and, detects a fault based on a degree of destruction of the correlation.

The technology described in the patent literature 1 will be explained in more detail. FIG. 17 is an explanatory drawing showing an example of a schematic whole configuration of a fault cause extraction system 901 including a fault cause extraction apparatus 910, according to the technology described in the patent literature 1. The fault cause extraction system 901 includes monitored computers 902A, 902B, 902C, . . . which are a plurality of managed apparatus and the fault cause extraction apparatus 910 which manages the operation of these computers 902. They are connected via a network 903 so that they can communicate mutually.

The fault cause extraction apparatus 910 acquires performance information including performance values for each of a plurality of performance items (for example, CPU utilization rate or remaining memory capacity) from each of the monitored computer 902A, 902B, 902C, . . . and, based on this performance information, performs the operation described below.

Here, the performance items, the managed apparatus (monitored computer 902) or their combination is defined as an element (a type of performance value, or simply, type) in the performance information.

FIG. 18 is an explanatory drawing showing a configuration of the fault cause extraction apparatus 910 and the monitored computer 902 shown in FIG. 17. As the monitored computers 902A, 902B, 902C, . . . shown in FIG. 17 have an identical configuration with the monitored computer 902A, detailed description is omitted in FIG. 18, and they are collectively named as the monitored computer 902. FIG. 19 is an explanatory drawing showing a flow of the processing of the fault cause extraction apparatus 910 shown in FIG. 18.

The fault cause extraction apparatus 910 according to the technology described in the patent literature 1 is, for example, a general computer apparatus and includes a main operation control unit (CPU: Central Processing Unit) 911 which works as a core in the execution of a computer program, a storage unit 912 which stores data, a communication unit 913 which performs data communication with other computers via the network 903, and an input/output unit 914 which accepts operations by a user (in this case, a network administrator) and also presents a processing result.

In the main operation control unit 911 of the fault cause extraction apparatus 910, each of a performance information accumulation unit 922, a correlation model generation unit 923, a correlation analysis unit 924, a fault analysis unit 925 and an administrator interaction unit 926 operates in a form of a computer program. Further, each of normal-state performance information 931, correlation model information 932 and analysis setting information 933 is stored in the storage unit 912.

The monitored computer 902 also includes a main operation control unit 951, a storage unit 952 and a communication unit 953 as the fault cause extraction apparatus 910 does. While the functions of these units are identical with ones of the main operation control unit 911, the storage unit 912 and the communication unit 913 in the fault cause extraction apparatus 910, respectively, each of a service execution unit 961, an information collection unit 962 and a countermeasure execution unit 963 in the main operation control unit 951 of the monitored computer 902, operates in a form of a computer program.

The service execution unit 961 of the monitored computer 902 provides an information and communications service such as a web service and a business service. The information collection unit 962 detects an operating state of the service execution unit 961, acquires performance information included in the operating state and sends the information to the performance information accumulation unit 922 of the fault cause extraction apparatus 910. The performance information accumulation unit 922 of the fault cause extraction apparatus 910 receives the performance information from the information collection unit 962 of each of the monitored computers 902 and stores the information as the normal-state performance information 931.

The correlation model generation unit 923 takes the performance information for a certain period from the normal-state performance information 931, and for time series of two arbitrary types of performance values in performance information, derives a transform function (correlation function) regarding one of the two time series as an input and the other as an output. The correlation model generation unit 923 compares a series of performance values generated by the transform function with a series of actually detected values of the performance values, and calculates weight information of the transform function from the difference between the two series of values. Furthermore, by repeating these processes on every pair of types, the correlation model generation unit 923 generates a correlation model for the overall operating state of the service execution unit 961. The correlation model generation unit 923 stores the generated correlation model as the correlation model information 932.

The correlation analysis unit 924 receives newly detected performance information from the performance information accumulation unit 922, analyzes whether performance values included in the received performance information satisfy the relationship represented by each of the transform functions of the correlation model stored in the correlation model information 932, within a certain error range, and outputs the results of the analysis.

The correlation analysis unit 924 calculates, based on a performance value newly detected for the first element and a correlation function, a predictive performance value for the second element, and then calculates a prediction error by comparing a performance value newly detected for the second element with the predictive performance value. The correlation analysis unit 924 analyzes whether the prediction error is within a predetermined error range. When the prediction error is out of the predetermined error range, the correlation analysis unit 924 judges that the correlation between the first and the second elements is destructed.

The fault analysis unit 925 receives the operating state collected by the performance information accumulation unit 922 and the result of analysis performed by the correlation analysis unit 924, and performs fault analysis according to the content of analysis setting stored in advance in the analysis setting information 933.

The administrator interaction unit 926 receives a result of the fault analysis from the fault analysis unit 925 and presents it to the administrator via the input/output unit 14. Then, the administrator interaction unit 926 accepts an operation input from the administrator and orders the countermeasure execution unit 963 of the monitored computer 902 to take countermeasures according to the operation input. The countermeasure execution unit 963 executes a process for the countermeasures against the fault on the service execution unit 961, in response to the order from the administrator interaction unit 926.

The administrator interaction unit 926 presents the results of such fault analysis to the administrator via the input/output unit 14. When an input for ordering some kind of countermeasure is made by an administrator via the input/output unit 14, the administrator interaction unit 926 sends the content of this input to the countermeasure execution unit 963 and makes it execute the countermeasure. For example, when an abnormality has occurred in the CPU utilization rate or the remaining memory capacity for a specific one of the monitored computers 902, the administrator orders a countermeasure such as to reduce the amount of operations ordered to that one of the monitored computers 902 and then to move those operations to another one of the monitored computers 902.

After that, if no correlation destruction is detected in values of the performance information collected at a constant time interval by the performance information accumulation unit 922, the fault analysis unit 925 judges that it is recovered from the fault, and this result is presented to the administrator via the administrator interaction unit 926. By repeating these processes of collecting information, analyzing, and taking countermeasures, the detection of the faults and the countermeasures against the faults on the service execution unit 961 are performed continually.

FIG. 20 is an explanatory drawing showing an example of the normal-state performance information 931 which is accumulated in the performance information accumulation unit 922 shown in FIG. 18 and FIG. 19. The information collection unit 962 of the monitored computer 902 detects an operating state of the service execution unit 961, extracts the performance information from the operating state and sends the information to the performance information accumulation unit 922 of the fault cause extraction apparatus 910. The performance information accumulation unit 922 records and accumulates the received performance information as the normal-state performance information 931.

The normal-state performance information 931 is a list of the performance information which is collected successively by the information collection unit 962 for the service execution unit 961. Each piece of performance information includes a plurality of items of performance values measured at the same time by each of the monitored computer 902 shown in FIG. 17, and is listed at a predetermined time interval. For example, when web services are executed at the service execution unit 961, the information collection unit 962 detects CPU utilization rates or remaining memory capacities for each of the monitored computers 902 providing the web services at a predetermined time interval, and sends the information to the performance information accumulation unit 922 of the fault cause extraction apparatus 910. The performance information accumulation unit 922 records and accumulates this information as the normal-state performance information 931.

FIG. 20 indicates an example of thus accumulated normal-state performance information 931. Here, the monitored computers 902 shown in FIG. 17 are designated individually as monitored computers 902A, 2B, 2C, . . . . The name of the monitored computers 902A, 902B, 902C, . . . are "A", "B", "C", respectively.

For example, the type "A.CPU" indicates the CPU utilization rate for the monitored computer 902A (A), and it can be seen that the performance value for "A.CPU" measured at 17:25 of Apr. 5, 2010 is "12" and that the performance values measured subsequently at an interval of one minute are, in the order from 17:26, "15", "34", "63", . . . , respectively. Similarly, the type "A.MEM" indicates the memory usage for the monitored computer 902A (A), and the performance value of "A.MEM" measured at the same times as that for "A.CPU" are presented. The type "B.CPU" indicates the CPU utilization rate for the monitored computer 902B (B), and the performance values of "B.CPU" measured at the same times as that for the other performance values are presented.

The correlation model generation unit 923 performs processing of correlation model generation as shown below, with regard to each type of performance values in thus accumulated normal-state performance information 931. For example, the correlation model generation unit 923 approximates a relation between x and y with an approximate equation "y=f(x)=Ax+B" (A and B are constants), where "A.CPU" is regarded as x and "A.MEM" as y, and calculates the values of the coefficients as "A=−0.6" and "B=100". The correlation model generation unit 923 calculates a weight value as "w=0.88" from the differences between the series of predictive performance value based on the transform function and the actual performance values.

FIG. 21 is an explanatory drawing showing an example of the correlation model information 932 generated from the normal-state performance information 931 shown in FIG. 20, by the correlation model generation unit 923. FIG. 22 is a flow chart showing operation of a fault cause extraction performed by the fault cause extraction apparatus 910 shown in FIG. 18.

The correlation model information 932 includes, for every pair of the types recorded as above in the normal-state performance information 931, the names of the types regarded as an input and an output of the transform function, each value of the coefficients and weights specifying the transform function, and correlation judgment information (validity) indicating whether the corresponding correlation is valid or not.

For example, with regard to the correlation between "A.CPU" and "A.MEM" shown in FIG. 21, a correlation having a value of the coefficient A "−0.6", a value of the coefficient B "100" and a value of the weight "0.88" in the equation "y=Ax+B" for the output "A.MEM", is stored in the correlation model information 932.

The correlation model generation unit 923 performs such analysis for every pair of the types in the normal-state performance information 931 accumulated in the performance information accumulation unit 922, and generates the correlation model information 932 based on the performance information acquired while the whole of the fault cause extraction system 901 is operating stably and normally (Step S991 in FIG. 22).

FIG. 23 is an explanatory drawing showing the content of a display screen 990 presented to the administrator by the administrator interaction unit 926, based on the correlation model information 932 shown in FIG. 21. The display screen 990 shown in FIG. 23 displays each of the number of correlation destruction 990a, a correlation graph 990b and a list of abnormal elements 990c. Details of them will be shown below.

The correlation graph 990b indicates correlations between one element and another element in the fault cause extraction system 901. In the example shown in FIG. 23, each of the CPU utilization rates and the memory usages for three monitored computers 902A, 2B and 2C are represented by six elements from A to F of performance information, respectively. The elements A, B, . . . are indicated by "A", "B", . . . in circles, respectively.

The CPU utilization rates and the memory usages for the monitored computers are represented as "A.CPU" and "A.MEM" for 902A, "B.CPU" and "B.MEM" for 902B, respectively. The element A represents "A.CPU", that is, the CPU utilization rate for the monitored computer 902A. Similarly, the element D represents "C.CPU", that is, the CPU utilization rate for the monitored computer 902C.

Then, the lines connecting respective elements with each other represent the relationships represented by the transform functions in the correlation model. If the weight w, which is defined in the range from 0 to 1, is equal to or greater than 0.5, the relationship is represented with a solid line and if the weight w is smaller than 0.5, the relationship is not represented. For example, as the weight w of the correlation between the element A and B is equal to or greater than 0.5, these elements are connected with a solid line. As the weight w of the correlation between the element A and F is smaller than 0.5, these elements are not connected.

The correlation analysis unit 924 judges, for every pair of the types whose weight w is equal to or greater than 0.5, whether the weight w is equal to or greater than a specific threshold value or not, that is, whether the correlation is valid or not. And the correlation analysis unit 924 performs the above-described correlation analysis on newly acquired performance information (Step S992 in FIG. 22).

Then, there may be a case in which a correlation which was valid, while the whole of the fault cause extraction system 901 was operating normally, changes into invalid as time goes on. This is the "correlation destruction" defined in the exemplary embodiment, and implies that any kind of change has occurred clearly in the operating state of the fault cause extraction system 901.

When correlation destruction is detected, the correlation analysis unit 924 displays it on the display screen 990 (Steps S993 to 994 in FIG. 22). The number of correlation destruction 990a indicates the number of occurrence of the detected correlation destruction in time series. The list of abnormal elements 990c indicates the elements on which the correlation destruction has occurred. The correlation graph 990b indicates the destructed correlation with a thick line.

On the display screen 990, in response to the operation on the screen by the administrator, it is possible to indicate details of each element and to order to take countermeasures for the element. The above are about the operation of the fault cause extraction apparatus 910 described in the patent literature 1.

Other than the patent literature 1, there is following technical literature. In patent literature 2, a fault detection apparatus which uses the same correlation model as one in the patent literature 1 in order to predict a bottleneck which occurs in actual operation is disclosed. In patent literature 3, an abnormality symptom detection apparatus which calculates a correlation coefficient matrix and its inverse matrix, and detects an abnormality symptom of a monitored apparatus is disclosed.

CITATION LIST

Patent Literature

[Patent Literature 1] Japanese Patent Application Laid-Open No. 2009-199533
[Patent Literature 2] Japanese Patent Application Laid-Open No. 2009-199534
[Patent Literature 3] Japanese Patent Application Laid-Open No. 2008-146591

SUMMARY OF INVENTION

Technical Problem

In the technology disclosed in the patent literature 1, a degree of abnormality for adjacent devices in physical connection relationships is able to be calculated based on the number of elements related to destructed correlations, a total of degrees of the destruction, or a ratio of destructed correlations. Even if an obvious fault has not occurred at present, it is possible to extract an element which is a possible cause of the fault by detecting the correlation destruction and to take countermeasures such as reinforcements of equipments.

However, the technology disclosed in the patent literature 1 does not consider "a specific abnormality which is possible to occur for the detected correlation destruction" nor present it in advance.

For example, when the technology disclosed in the patent literature 1 is applied to a general three tier system including a web server, an application server, and a database server, whether the web server is possible to be in overloaded state or the application server is possible to be in a fault state for the detected correlation destruction is not presented in advance. Therefore, it is difficult to prepare countermeasures against a fault which is possible to occur.

Similarly, the technologies disclosed in the patent literature 2 and 3, does not consider "a specific abnormality which is possible to occur for the detected correlation destruction", so that, even if these technologies are combined with the technology described in the patent literature 1, a specific fault which is possible to occur for correlation destruction is not presented.

The object of the present invention is to provide a fault detection apparatus, a fault detection method and a program recording medium which is able to estimate a fault which is possible to occur for detected correlation destruction.

Solution to Problem

A fault detection apparatus according to an exemplary aspect of the invention includes storage means for storing correlation destruction set information which indicates a correlation on which correlation destruction was detected when a fault occurred, among correlations included in a correlation model representing correlations between a plurality types of performance values of a system, and correlation model comparison means for calculating a commonality between the correlation included in the correlation destruction set information and correlation on which correlation destruction is detected for inputted performance values.

A fault detection method according to an exemplary aspect of the invention includes storing correlation destruction set information which indicates a correlation on which correlation destruction was detected when a fault occurred, among correlations included in a correlation model representing correlations between a plurality types of performance values of a system, and calculating a commonality between the correlation included in the correlation destruction set information and correlation on which correlation destruction is detected for inputted performance values.

A computer readable storage medium according to an exemplary aspect of the invention, records thereon a program causing a computer to perform a method including storing correlation destruction set information which indicates a correlation on which correlation destruction was detected when a fault occurred, among correlations included in a correlation model representing correlations between a plurality types of performance values of a system, and calculating a commonality between the correlation included in the correlation destruction set information and correlation on which correlation destruction is detected for inputted performance values.

Advantageous Effects of Invention

The effect of the present invention is that it is able to estimate a fault which is possible to occur for detected correlation destruction.

BRIEF DESCRIPTION OF DRAWINGS

FIG. 20 An explanatory drawing showing an example of normal-state performance information which is accumulated in the performance information accumulation unit shown in FIG. 18 and FIG. 19.

FIG. 21 An explanatory drawing showing an example of correlation model information generated from the normal-state performance information shown in FIG. 20, by a correlation model generation unit.

DESCRIPTION OF EMBODIMENTS

First Exemplary Embodiment

Figure 1:
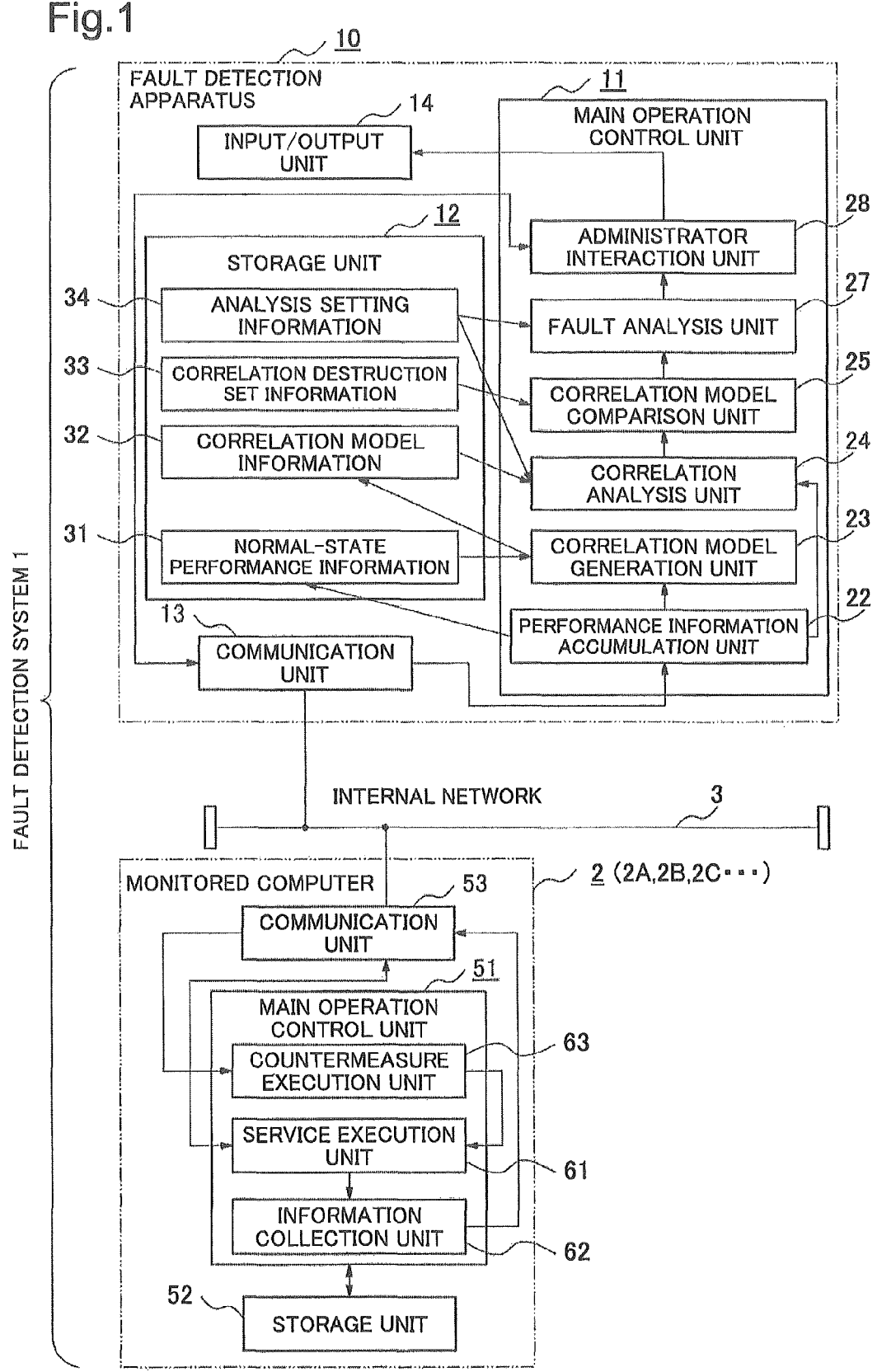
FIG. 1 An explanatory drawing showing a configuration of a fault detection apparatus and a monitored computer according to a first exemplary embodiment of the present invention.

Hereinafter, a configuration of a first exemplary embodiment of the present invention will be explained based on FIG. 1.

The basic content of the first exemplary embodiment will be explained first, and after that, more concrete content will be explained.

A fault detection apparatus 10 according to the first exemplary embodiment acquires performance information including performance values for each of a plurality of performance items related to operating states of managed apparatus 2 from a plurality of the managed apparatuses 2 which are computer apparatuses included in a system, and extracts a cause of a fault which is occurring on the managed apparatus.

This fault detection apparatus 10 includes a correlation model generation unit 23, a correlation analysis unit 24, a storage unit 12 and a correlation model comparison unit 25.

The correlation model generation unit 23 derives a correlation function between two arbitrary elements of performance series information among pieces of performance series information each indicating a time series variation of performance values for each element acquired at a constant time interval, where the performance item, the managed apparatus or their combination is defined as an element (a type of performance value, or simply, a type), and generates a correlation model including the correlation function for every pair of elements.

When performance information is newly detected, the correlation analysis unit 24 applies the correlation function in the correlation model to a performance value newly detected for the first element among two arbitrary elements, calculates a predictive performance value for the second element among the two arbitrary elements, compares a detected performance value with the predictive performance value for the second element and calculates a prediction error. The correlation analysis unit 24 analyzes whether the prediction error is within a predetermined error range for every pair of elements of the performance information newly detected, and in case the prediction error is out of the error range, judges that the correlation between the first and the second elements is destructed.

The storage unit 12 stores correlation destruction set information 33 with the correlation model in advance. The correlation destruction set information 33 is data associating a list of element pairs in the correlation model for which the correlation analysis unit 24 had judged that the correlation was destructed when a fault occurred actually in the managed apparatus (a list of correlations on which the correlation destruction was detected when the fault occurred), with a phenomenon name of the occurred fault.

The correlation model comparison unit 25 performs matching check between the element pairs for which the correlation analysis unit 24 has judged that the correlation is newly destructed (the correlations on which the correlation destruction is newly detected) and the correlation destruction set information 33, and calculates a commonality which is a ratio of the number of the matched pairs (correlations) between both of them to the total number of the pairs (correlations) registered in the correlation destruction set information 33. When the commonality is equal to or greater than the boundary-commonality given in advance, the correlation model comparison unit 25 issues a warning.

Here, the correlation destruction set information 33 may include the boundary-commonality associated with the list of pairs and the phenomenon name.

The fault detection apparatus 10 includes an administrator interaction, unit 28 which displays time series variation of the commonality with the warning.

Having such a configuration, the fault detection apparatus 10 is able to estimate a fault which is possible to occur for correlation destruction.

Hereinafter, the first exemplary embodiment will be explained in more detail.

Figure 2:
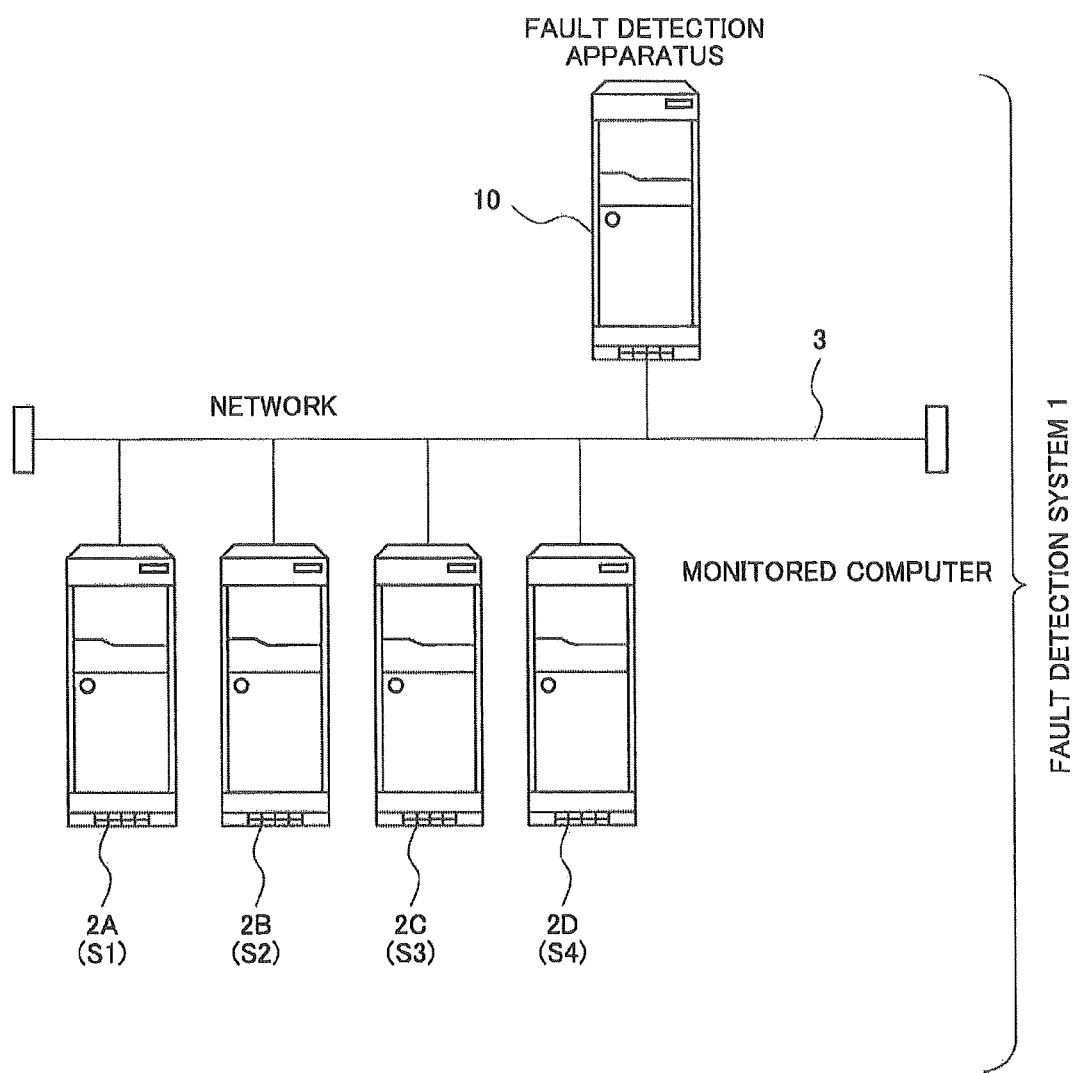
FIG. 2 An explanatory drawing showing an example of a schematic whole configuration of a fault cause extraction system 1 including the fault detection apparatus according to the first exemplary embodiment of the present invention.

FIG. 2 is an explanatory drawing showing an example of a schematic whole configuration of the fault cause extraction system 1 including the fault detection apparatus 10 according to the first exemplary embodiment of the present invention. The fault cause extraction system 1 according to the first exemplary embodiment includes monitored computers 2A, 2B, 2C, . . . which are a plurality of managed apparatuses and the fault detection apparatus 10 which manages the operation of these computers 2. They are connected via a network 3 so that they can communicate mutually.

The fault detection apparatus 10 acquires performance information including performance values for each of a plurality of performance items (for example, CPU utilization rate or remaining memory capacity) from each of the monitored computers 2A, 2B, 2C, . . . and, based on this performance information, performs operations described below. Although, in FIG. 2, an example in which four monitored computers 2A, 2B, 2C and 2D exist is shown, the number of monitored computers 2 is arbitrary.

Figure 3:
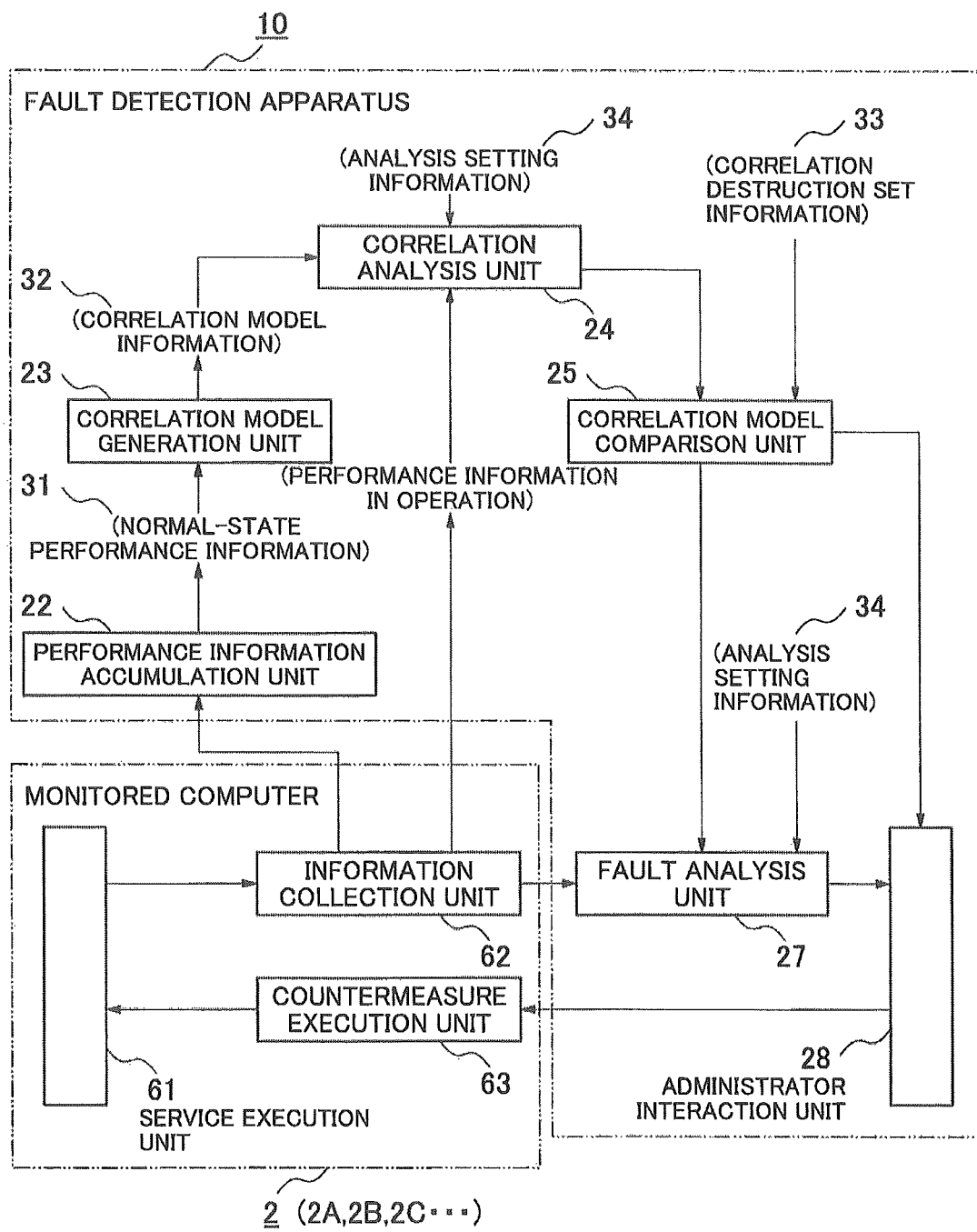
FIG. 3 An explanatory drawing showing a flow of processing of the fault detection apparatus shown in FIG. 1.

FIG. 1 is an explanatory drawing showing a configuration of the fault detection apparatus 10 and the monitored computer 2 according to the first exemplary embodiment of the present invention. As the monitored computers 2A, 2B, 2C, . . . shown in FIG. 2 have an identical configuration with the monitored computer 2A, detailed description is omitted in FIG. 1, and they are collectively named as the monitored computer 2. FIG. 3 is an explanatory drawing showing a flow of processing of the fault detection apparatus 10 shown in FIG. 1.

The fault detection apparatus 10 according to the first exemplary embodiment of the present invention is, for example, a general computer apparatus and includes a main operation control unit (CPU: Central Processing Unit) 11 which works as a core in the execution of a computer program, a storage unit 12 which stores data, a communication unit 13 which performs data communication with other computers via the network 3, and an input/output unit 14 which accepts operations by an administrator and also presents a processing result.

In the main operation control unit 11 of the fault detection apparatus 10, each of a performance information accumulation unit 22, a correlation model generation unit 23, a correlation analysis unit 24, a correlation model comparison unit 25, a fault analysis unit 27 and an administrator interaction unit 28 operates in a form of a computer program. Further, each of normal-state performance information 31, correlation model information 32, correlation destruction set information 33 and analysis setting information 34 is stored in the storage unit 12.

The monitored computer 2 also includes a main operation control unit 51, a storage unit 52 and a communication unit 53 as the fault detection apparatus 10 does. While the functions of these unit are identical with ones of the main operation control unit 11, the storage unit 12 and the communication unit 13 in the fault detection apparatus 10, respectively, each of a service execution unit 61, an information collection unit 62 and a countermeasure execution unit 63 in the main operation control unit 51 of the monitored computer 2, operates in a form of a computer program.

The service execution unit 61 of the monitored computer 2 provides an information and communications service such as web services and business services. The information collection unit 62 detects an operating state of the service execution unit 61, acquires performance information included in the operating state and sends the information to the performance information accumulation unit 22 of the fault detection apparatus 10. The performance information accumulation unit 22 of the fault detection apparatus 10 receives performance information from the information collection unit 62 of each of the monitored computers 2 and stores the information as the normal-state performance information 31.

The correlation model generation unit 23 takes the performance information for a certain period from the normal-state performance information 31, and for the time series of two arbitrary types of performance values in performance information, derives a transform function (correlation function) regarding one of the two time series as an input and the other as an output. The correlation model generation unit 23 compares a series of performance values generated by the transform function with a series of actually detected values of the performance values, and calculates weight information of the transform function from the difference between the two series of values. Furthermore, by repeating these processes on every pair of types, the correlation model generation unit 23 generates a correlation model for the overall operating state of the service execution unit 61. The correlation model generation unit 23 stores the generated correlation model as the correlation model information 32.

The correlation analysis unit 24 receives newly detected performance information (performance information in operation) from the performance information accumulation unit 22, analyzes whether the performance values included in the received performance information satisfy the relationship represented by each of the transform functions of the correlation model stored in the correlation model information 32, within a certain error range, and outputs the results of the analysis.

Figure 4:
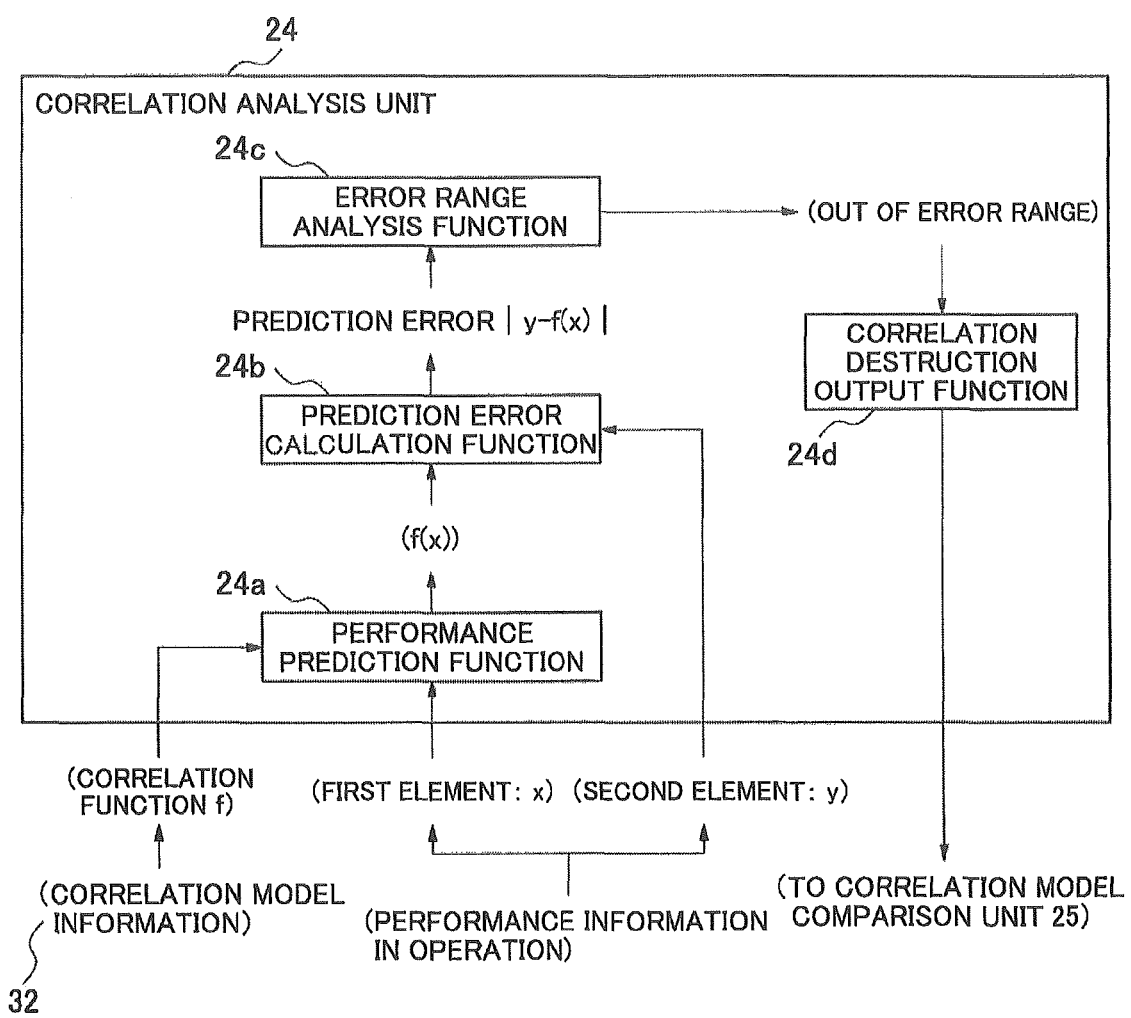
FIG. 4 An explanatory drawing explaining more detailed operation of the correlation analysis unit shown in FIG. 1 and FIG. 3.

FIG. 4 is an explanatory drawing explaining more detailed operation of the correlation analysis unit 24 shown in FIG. 1 and FIG. 3. The correlation analysis unit 24 includes a performance prediction function 24a, a prediction error calculation function 24b, an error range analysis function 24c and a correlation destruction output function 24d as functions. The performance prediction function 24a applies a performance value for the first element in the performance information in operation newly received from the performance information accumulation unit 22 to the correlation function and calculates a predictive performance value for the second element. The prediction error calculation function 24b compares a performance value with the predictive performance value for the second element, and calculates a prediction error. The error range analysis function 24c analyzes whether the prediction error is within the predetermined error range. In case the prediction error is out of the error range, the correlation destruction output function 24d judges that the correlation between the first element and second elements is destructed and outputs it.

When the pieces of performance information in operation for the first and second elements are regarded as x and y, respectively, and a correlation function in the correlation model information 32 is regarded as f, the performance prediction function 24a calculates f(x) from x, and the prediction error calculation function 24b calculates prediction error |y−f(x)|. The error range analysis function 24c analyzes whether the prediction error |y−f(x)| is within the range of a threshold value stored in the correlation analysis unit 24 in advance, and in case the prediction error is out of the error range, the correlation destruction output function 24d outputs it.

The fault analysis unit 27 receives the operating state collected by the performance information accumulation unit 22 and the result of analysis performed by the correlation analysis unit 24, and performs analysis of occurrence of a fault according to the content of analysis setting stored in advance in the analysis setting information 34. The analysis setting information 34 further includes the threshold value which is criteria for judging correlation destruction by the correlation analysis unit 24.

The administrator interaction unit 28 receives the result of the fault analysis from the fault analysis unit 27 and presents it to the administrator via the input/output unit 14. Then, the administrator interaction unit 28 accepts an operation input from the administrator and, according to this operation input, orders the countermeasure execution unit 63 of the monitored computer 2 to take countermeasures. The countermeasure execution unit 63 executes a process for the countermeasures against the fault on the service execution unit 61, in response to the order from the administrator interaction unit 28.

The above are about the configuration and operation common to the fault detection apparatus disclosed in the patent literature 1 mentioned above. The fault detection apparatus 10 according to the first exemplary embodiment further includes the correlation model comparison unit 25 operating in the main operation control unit 11 and the correlation destruction set information 33 stored in the storage unit 12. When the correlation model comparison unit 25 judges that the commonality exceeds the threshold value, the administrator interaction unit 28 presents a warning display including the judgment result, the destructed correlation and the commonality to the administrator.

Figure 5A:
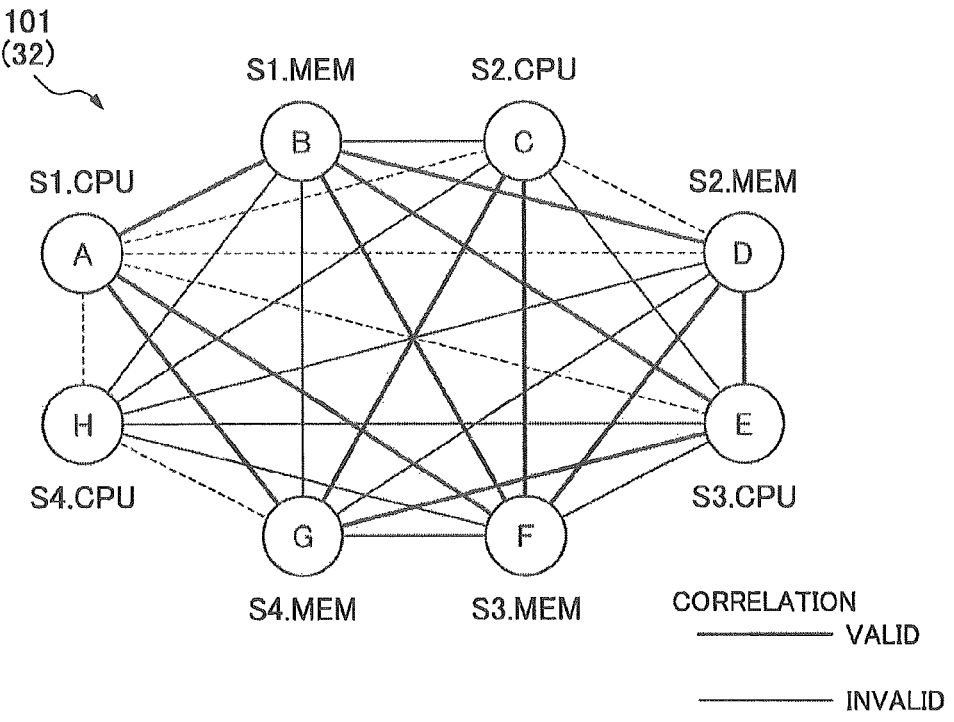
FIG. 5A An explanatory drawing showing an example of the correlation model shown in FIG. 1 and FIG. 3.
Figure 5B:
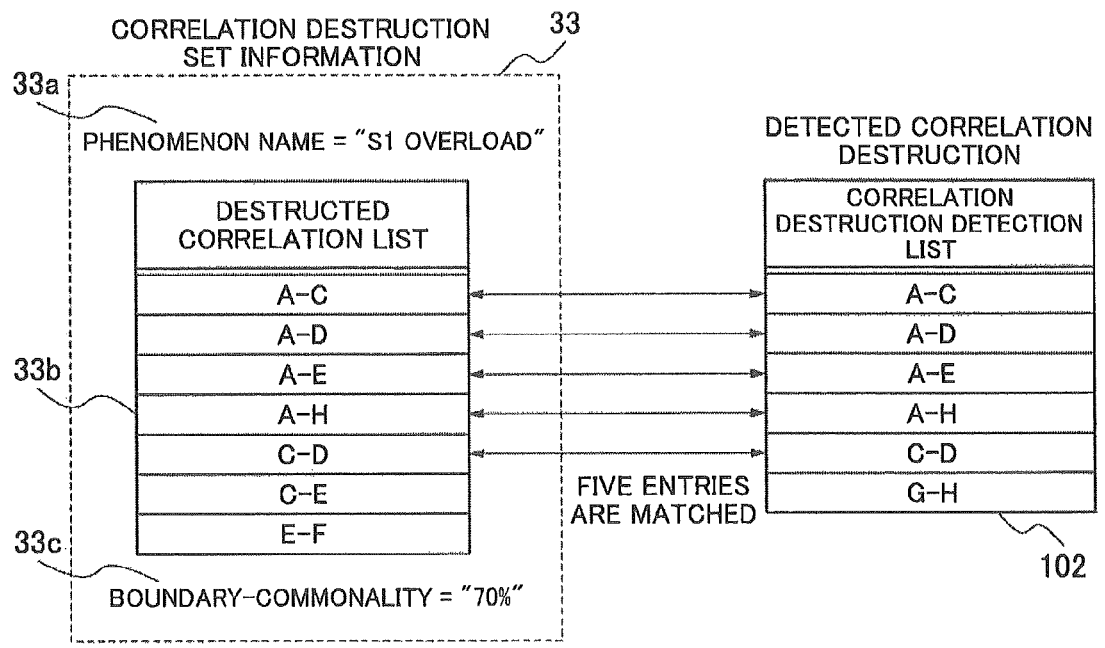
FIG. 5B An explanatory drawing showing an example of the correlation destruction set information shown in FIG. 1 and FIG. 3.

FIG. 5A and FIG. 5B are explanatory drawings showing examples of the correlation model and the correlation destruction set information 33 shown in FIG. 1 and FIG. 3. The correlation destruction set information 33 includes a phenomenon name 33a of a fault which occurred in the past, a destructed correlation list 33b which is a list of correlation on which destruction was observed when the fault occurred, and a boundary-commonality 33c which is a threshold value of the commonality for judging that the fault is occurring. The boundary-commonality 33c is a threshold value for the ratio of the destructed correlations to the correlations of the destructed correlation list 33b.

The correlation destruction set information 33 is inputted by the system administrator in advance based on the content of correlation destruction detected by the correlation analysis unit 24 when the fault was observed actually. A plurality of these sets of the phenomenon name 33a, the destructed correlation list 33b and the boundary-commonality 33c are stored.

The correlation model comparison unit 25 compares a list of the current destructed correlations which are detected by the correlation analysis unit 24 with the destructed correlation list 33b of the correlation destruction set information 33, calculates "commonality" based on the number of destructed correlations which are common to both of them, and compares the commonality with the boundary-commonality 33c.

In the correlation model comparison unit 25, only one set among a plurality of sets of the phenomenon name 33a, the destructed correlation list 33b and the boundary-commonality 33c stored in the correlation destruction set information 33 is used for comparison. For example, in a system of a typical three tier configuration including a web server, an application server and a database server, the destructed correlations in case the web server is in an abnormal state and the ones in case the application server is in an abnormal state are different for the identical correlation model. For example, in the former case, the phenomenon name 33a "abnormality of web server" and the destructed correlation list 33b including the correlations on which the destruction was observed at that time have been stored in association with each other. The same goes for the phenomenon name 33a "abnormality of application server".

The boundary-commonality 33c is the threshold value for judging that the phenomenon is occurring for each of the cases mentioned above. As the value of the boundary-commonality 33c, a different value for each phenomenon which is used for the judgment may be inputted by the system administrator in advance. The higher boundary-commonality 33c, when a fault with the phenomenon name 33a is occurring, enables to detect only the correlation destruction status which is near to the correlation destruction status observed for the fault. However, even if the correlation destruction status indicating high likelihood of the occurrence of the fault is occurring, a warning may not be outputted and the administrator may overlook the status. Conversely, the lower boundary-commonality 33c decreases the possibility that the status indicating high likelihood of the occurrence of the fault is overlooked. However, even if the correlation destruction status which is not caused by the fault and does not need to be handled urgently is occurring, a warning may be outputted. The system administrator needs to set the boundary-commonality 33c considering this.

In an example shown in FIG. 2 and FIG. 5A, four computers S1 to S4 exist as the monitored computers 2. In each of these four computers S1 to S4, the information collection unit 62 acquires performance information including "CPU utilization rate" and "remaining memory capacity" as performance items and transmits them to the fault detection apparatus 10.

Here, for example, the CPU utilization rate "S1.CPU" and the remaining memory capacity "S1.MEM" of the computer S1 are regarded as element "A" and "B", respectively. The CPU utilization rate "S2.CPU" and the remaining memory capacity "S2.MEM" of the computer S2 are regarded as element "C" and "D", respectively. The CPU utilization rate "S3.CPU" and the remaining memory capacity "S3.MEM" of the computer S3 are regarded as element "E" and "F", respectively. The CPU utilization rate "S4.CPU" and the remaining memory capacity "S4.MEM" of the computer S4 are regarded as element "G" and "H", respectively.

FIG. 5A indicates a correlation model 101 illustrating the correlation model information 32 generated by the correlation model generation unit 23 for the computers S1 to S4. In the correlation model 101, the correlation for which a calculated weight is equal to or greater than 0.5 is indicated by "thick solid line" and correlation for which a calculated weight is less than 0.5 is indicated with "thin solid line", respectively. In analysis of the correlation analysis unit 24, correlation destruction is detected on six entries (correlations) "A-C", "A-D", "A-E", "A-H", "C-D" and "G-H" in the correlation model. The correlations each of which correlation destruction is detected are indicated with "thick broken line".

FIG. 5B indicates the content stored in the correlation destruction set information 33 for the correlation model 101. In this example, the information indicating that correlation destruction was detected on seven entries "A-C", "A-D", "A-E", "A-H", "C-D", "C-E" and "E-F" when a fault of "S1 overload" occurred among four computers S1-S4 in the past has been stored. The phenomenon name 33a is "S1 overload", and the destructed correlation list 33b associated with this includes seven entries "A-C", "A-D", "A-E", "A-H", "C-D", "C-E" and "E-F".

Furthermore, the information indicating that correlation destruction is detected on each of entries (correlations) "A-C", "A-D", "A-E", "A-H", "C-D" and "G-H" is newly detected. These entries are indicated in a correlation destruction detection list 102. The correlation model comparison unit 25 compares each entry of the correlation destruction detection list 102 with each entry of the destructed correlation list 33b associated with the phenomenon name 33a "S1 overload" in the correlation destruction set information 33. As a result, five entries among seven entries of the detected correlation destruction are included in the destructed correlation list 33b associated with the phenomenon name 33a "S1 overload". The correlation model comparison unit 25 applies these numbers of entries to Equation 1 below and obtains the commonality.

Commonality=(Number of entries common between the correlation destruction detection list 102 and the destructed correlation list 33b)/(Number of all entries of the destructed correlation list 33b)  [Equation 1]

In case of the examples shown in FIG. 5A and FIG. 5B, as five entries among all of seven entries of the destructed correlation list 33b associated with the phenomenon name 33a "S1 overload" match to ones of the correlation destruction detection list 102, respectively, the commonality is calculate as 5/7=approximately 71.4%. For example, in case the boundary-commonality 33c associated with the phenomenon name 33a "S1 overload" is defined as "equal to or greater than 70%", because the calculated commonality "71.4%" exceeds this boundary-commonality 33c, the correlation model comparison unit 25 presents a warning screen mentioned below to the administrator via the administrator interaction unit 28. Note that, the definition of the boundary-commonality 33c can be set arbitrary as mentioned above, and this setting "equal to or greater than 70%" is just one example thereof.

Figure 7:
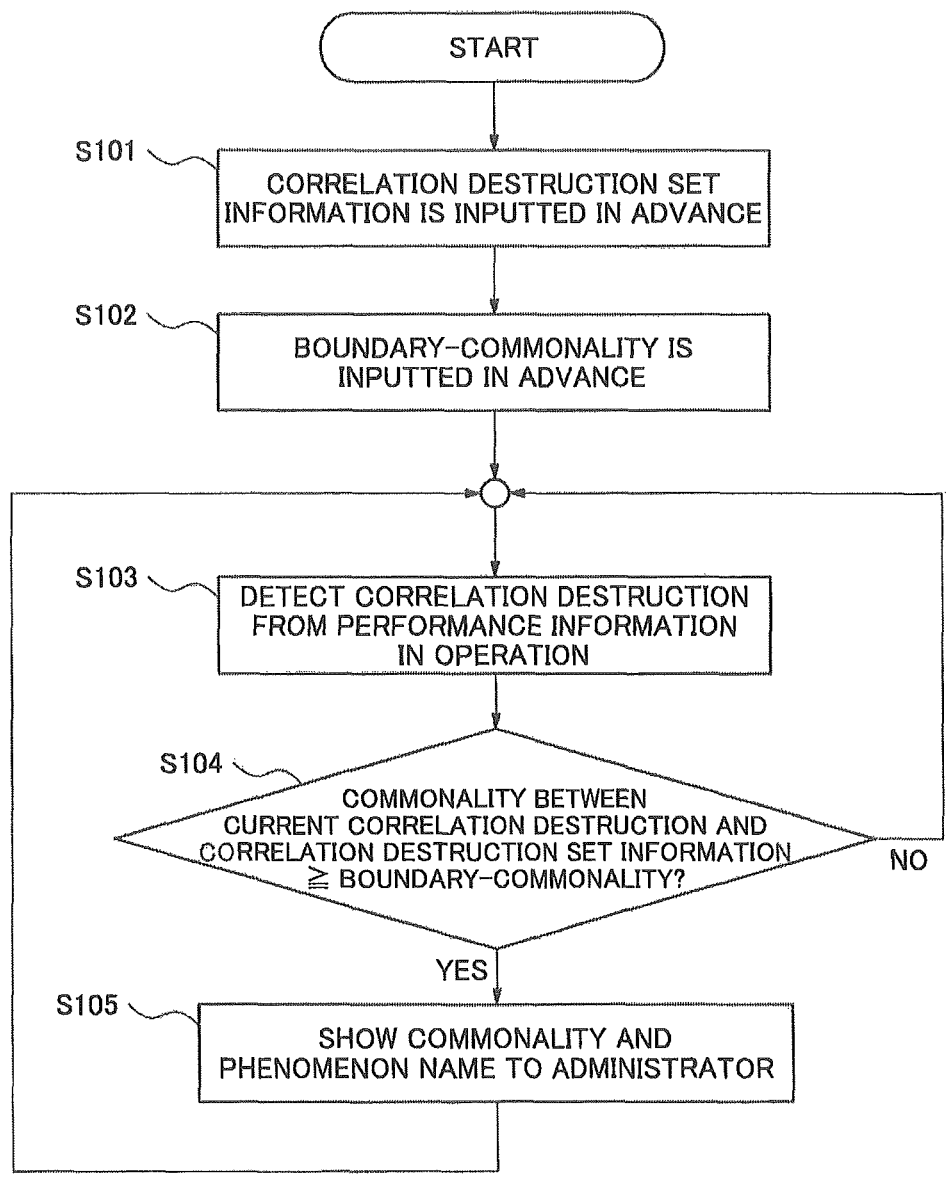
FIG. 7 A flow chart showing operation of prediction of an abnormality possible to occur based on destructed correlations, performed by the fault detection apparatus shown in FIG. 1 and FIG. 3.

FIG. 7 is a flow chart showing operation of prediction of an abnormality possible to occur based on destructed correlations, performed by the fault detection apparatus 10 shown in FIG. 1 and FIG. 3. The fault detection apparatus 10 accepts an input of the correlation destruction set information 33 shown in FIG. 5B from the administrator (Step S101). The fault detection apparatus 10 accepts an input of the boundary-commonality 33c for each of sets of the phenomenon name and the list of destructed correlation in the correlation destruction set information 33 (Step S102).

The fault detection apparatus 10 detects correlation destruction which occurs in each element of the monitored computer 2, that is, each entry of the correlation destruction detection list 102 from performance information in operation with the same manner as disclosed in the patent literature 1 (Step S103). The correlation model comparison unit 25 compares the destructed correlation list 33b of the correlation destruction set information 33 with the correlation destruction detection list 102 for the detected correlation destruction, and obtains the commonality using Equation 1.

As a result, when the commonality of correlation destruction between the destructed correlation list 33b and the correlation destruction detection list 102 detected in Step S103 is equal to or greater than the value of the boundary-commonality 33c (YES in Step S104), the correlation model comparison unit 25 shows it to the administrator via the administrator interaction unit 28 (Step S105). When the commonality is less than the value of the boundary-commonality 33c (NO in Step S104), the processing is continued from Step S103.

Note that, when a plurality of the sets of phenomenon name 33a and the data associated therewith are stored in the correlation destruction set information 33, the fault detection apparatus 10 may select, for example, any one set thereof in advance, and may perform the processing shown in FIG. 7. Also the fault detection apparatus 10 may performs this processing for each of a plurality of sets of data in the correlation destruction set information 33, and when one of the commonalities is larger than the value of the boundary-commonality 33c, may issue a warning of Step S105.

Figure 6:
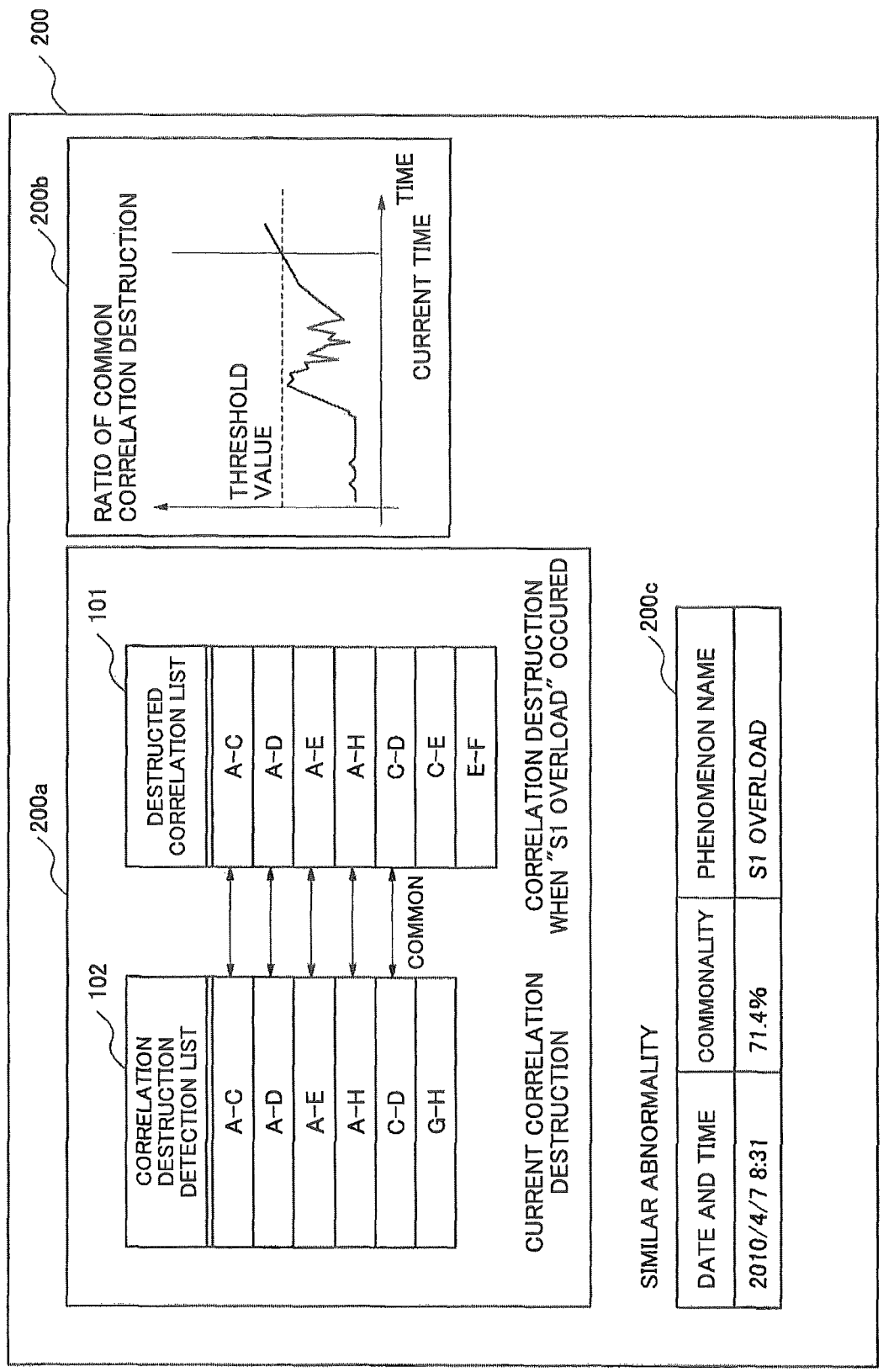
FIG. 6 An explanatory drawing showing an example of a display screen presented by an administrator interaction unit, as a result of the processing shown in FIG. 7.

FIG. 6 is an explanatory drawing showing an example of a display screen 200 presented by the administrator interaction unit 28, as a result of the processing shown in FIG. 7. The display screen 200 includes a comparison display 200a which compares correlation destruction status currently detected with the destructed correlation list 33b registered in the correlation destruction set information 33, a commonality variation graph 200b which displays a time series variation of the commonality of the correlation destruction, and an abnormal type display 200c which displays the phenomenon name 33a which is used for judgment with respect to the correlation destruction status.

Overall Operation of the First Exemplary Embodiment

Next, overall operation of the exemplary embodiment mentioned above will be explained.

The fault detection apparatus 10 according to the exemplary embodiment acquires performance information including performance values for each of a plurality of performance items related to operating states of the managed apparatus 2 from the a plurality of the managed apparatuses 2 which are computer apparatuses included in a system, and extracts a cause of a fault which is occurring on the managed apparatus.

The correlation model generation unit 23 derives a correlation function between two arbitrary elements of performance series information among pieces of performance series information each indicating a time series variation of performance values for each element acquired at a constant time interval, where the performance item, the managed apparatus or their combination is defined as an element (a type of performance value, or simply, a type), and generates a correlation model including the correlation function for every pair of elements.

When performance information is newly detected, the correlation analysis unit 24 applies the correlation function in the correlation model to a performance value newly detected for the first element among two arbitrary elements, calculates a predictive performance value for the second element among the two arbitrary elements, compares a detected performance value with the predictive performance value for the second element, and calculates a prediction error. The correlation analysis unit 24 analyzes whether the prediction error is within a predetermined error range for every pair of elements of the performance information newly detected, and in case the prediction error is out of the error range, judges that the correlation between the first and the second elements is destructed.

The storage unit 12 stores the correlation destruction set information 33 with the correlation model (Steps S101 to 102 in FIG. 7). The correlation destruction set information 33 is data associating a list of element pairs for which it was judged that the correlation was destructed (a list of correlations on which correlation destruction was detected) with a phenomenon name of the occurred fault.

The correlation model comparison unit 25 performs matching check between the element pairs for which it has been judged that the correlation is newly destructed (the correlations on which the correlation destruction is newly detected) and the correlation destruction set information 33, and calculates a commonality which is a ratio of the number of the matched pairs (correlations) between both of them to the total number of the pairs (correlations) registered in the numerical correlation destruction set information 33 (Steps S103 to 104 in FIG. 7). When the commonality is equal to or greater than the boundary-commonality given in advance, the correlation model comparison unit 25 issues a warning (Step S105 in FIG. 7).

Note that it is possible that each of the above-described operation steps is put into a program so that it can be executed by a computer, and that the program is executed by the fault detection apparatus 10, which is a computer to execute the above-described steps directly.

Figure 24:
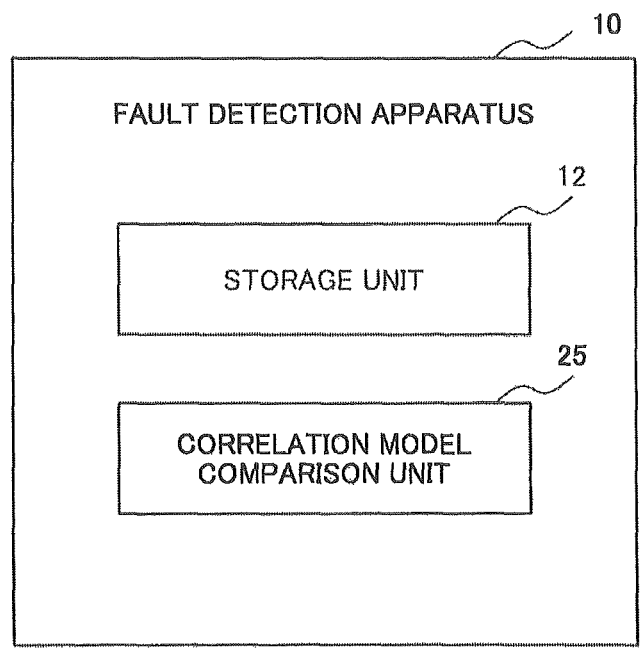
FIG. 24 A block diagram showing a characteristic configuration of the first exemplary embodiment of the present invention.

Next, a characteristic configuration of the first exemplary embodiment of the present invention will be explained. FIG. 24 is a block diagram showing a characteristic configuration of the first exemplary embodiment of the present invention.

The fault detection apparatus 10 includes the storage unit 12 and the correlation model comparison unit 25.

The storage unit 12 stores correlation destruction set information 33 which indicates correlations on which correlation destruction was detected when a fault occurred, among correlations included in a correlation model representing correlations between a plurality types of performance values of a system.

The correlation model comparison unit 25 calculates a commonality between the correlation included in the correlation destruction set information 33 and correlation on which correlation destruction is detected for inputted performance values.

According to the first exemplary embodiment of the present invention, it is able to estimate a fault which is possible to occur for detected correlation destruction. It is because the correlation destruction set information 33 including a list of element pairs (correlations) for which the correlation destruction was detected at the time of system fault has been prepared in advance, and a commonality between the correlation included in the list of the correlations and the correlation on which correlation destruction is newly detected is calculated.

As a result, it is possible to predict a fault having high likelihood of occurrence, and prepare countermeasures against the fault beforehand.

Also, because the content based on the fault which occurred actually in the past are stored in the correlation destruction set information 33, there is a high likelihood that content of the countermeasures which should be prepared to the fault are obvious from the experiences in the past. Therefore, burden of the administrator required for the countermeasures against the fault is reduced.

Second Exemplary Embodiment

In a fault detection apparatus 310 according to a second exemplary embodiment, in addition to the configuration of the fault detection apparatus 10 according to the first exemplary embodiment, the correlation destruction set information 33 includes an association of a list of element pairs (correlations) on which correlation destruction was detected with a phenomenon name for each of a plurality of faults which occurred actually in the managed apparatus 2. A correlation model comparison unit 325 calculates a commonality for the element pairs for which the correlation analysis unit 24 has been judged that the correlation is newly destructed (the correlations on which the correlation destruction is newly detected), with respect to each of the plurality of faults, and issues a warning in order from the highest commonality.

As a result, the second exemplary embodiment further has an effect that the administrator can also take countermeasures easily against a plurality of types of faults having high likelihood of occurrence in connection, in addition to the effect of the first exemplary embodiment.

Hereinafter, this will be explained in more detail.

Figure 8:
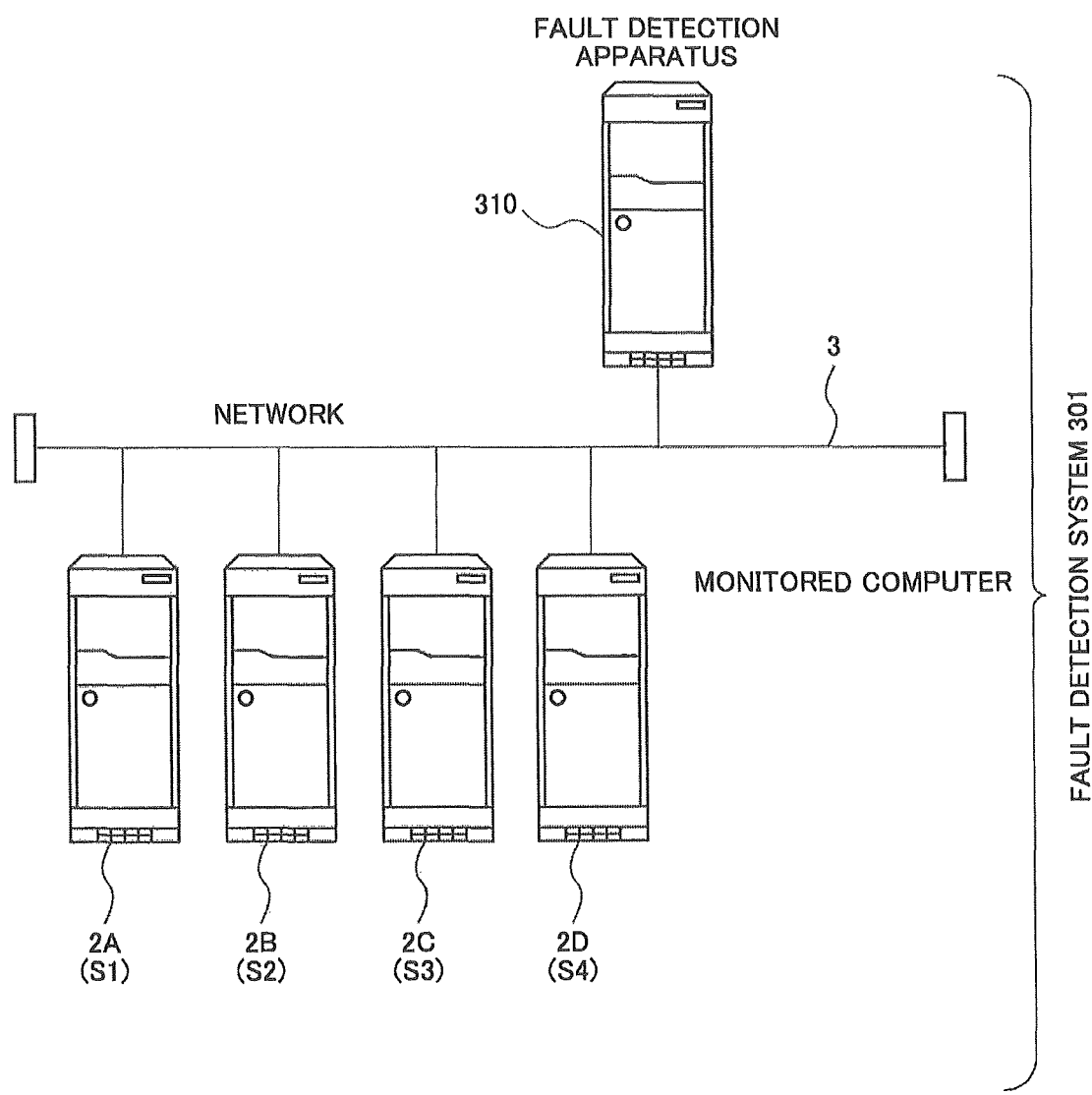
FIG. 8 An explanatory drawing showing an example of a schematic whole configuration of a fault cause extraction system including a fault detection apparatus according to a second exemplary embodiment of the present invention.

FIG. 8 is an explanatory drawing showing an example of a schematic whole configuration of a fault cause extraction system 301 including the fault detection apparatus 310 according to the second exemplary embodiment of the present invention. The fault cause extraction system 301 according to the second exemplary embodiment includes the monitored computers 2A, 2B, 2C, . . . which are a plurality of managed apparatuses and the fault detection apparatus 310 which manages the operation of these computers 2. They are connected via the network 3 so that they can communicate mutually. The monitored computers 2A, 2B, 2C, . . . are identical with the monitored computers 2 explained in the first exemplary embodiment. The fault detection apparatus 10 of the fault cause extraction system 1 according to the first exemplary embodiment is replaced with the fault detection apparatus 310.

Figure 9:
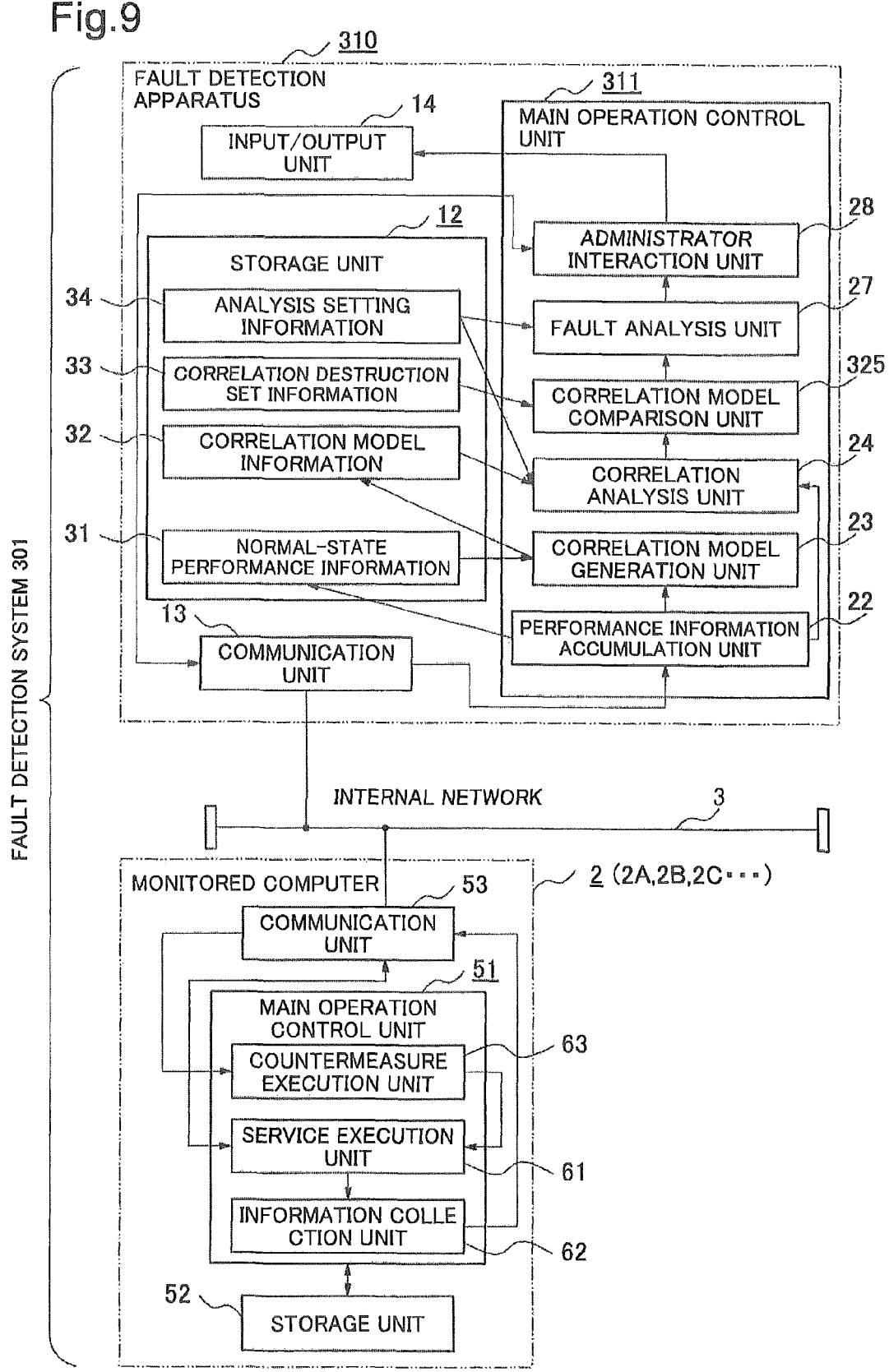
FIG. 9 An explanatory drawing showing a configuration of the fault detection apparatus shown in FIG. 8.
Figure 10:
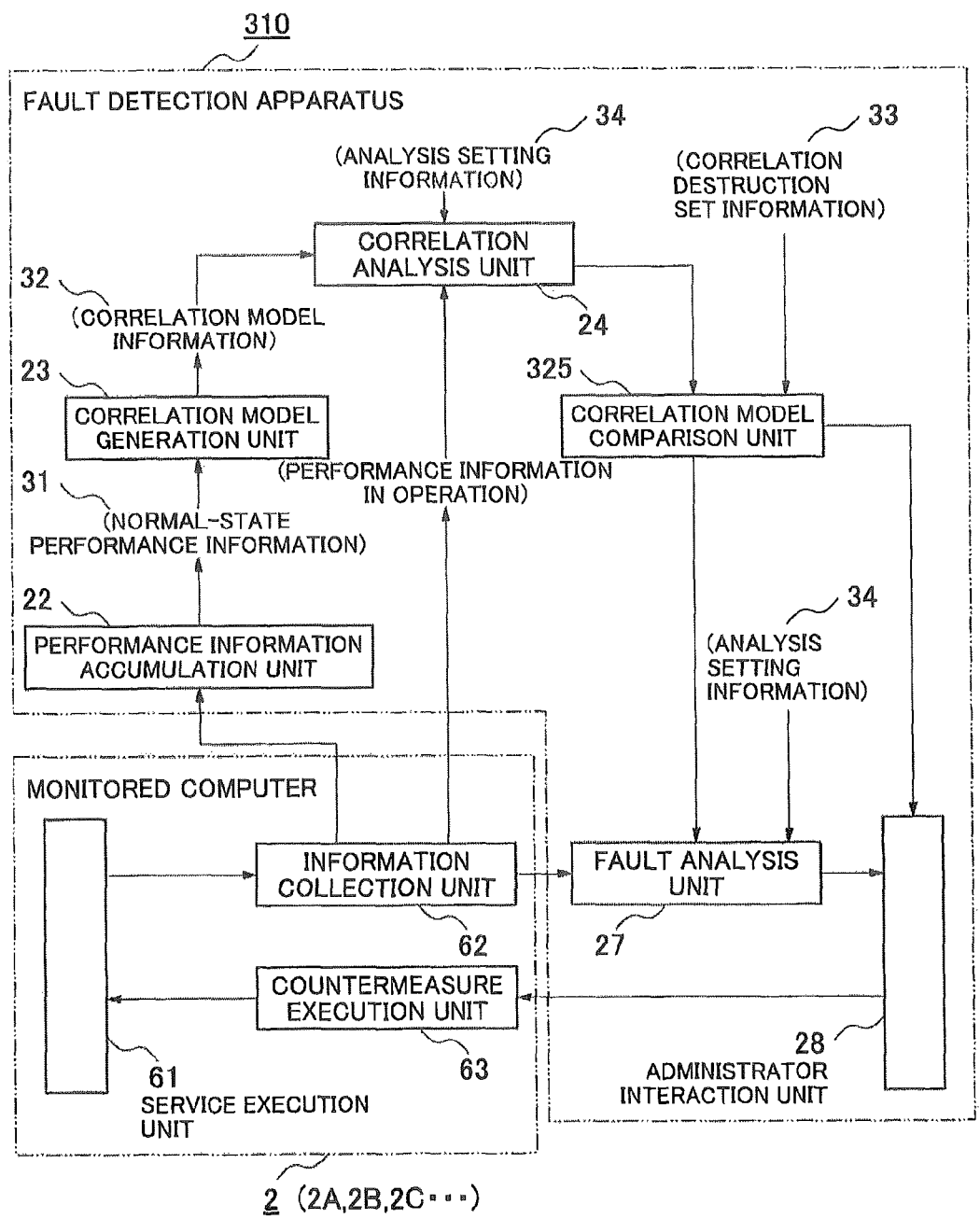
FIG. 10 An explanatory drawing showing a flow of processing of the fault detection apparatus shown in FIG. 9.

FIG. 9 is an explanatory drawing showing a configuration of the fault detection apparatus 310 shown in FIG. 8. FIG. 10 is an explanatory drawing showing a flow of processing of the fault detection apparatus 310 shown in FIG. 9. Although the basic configuration of the fault detection apparatus 310 according to the second exemplary embodiment of the present invention is identical with the fault detection apparatus 10 according to the first exemplary embodiment, the correlation model comparison unit 25 is replaced with the correlation model comparison unit 325.

Figure 11:
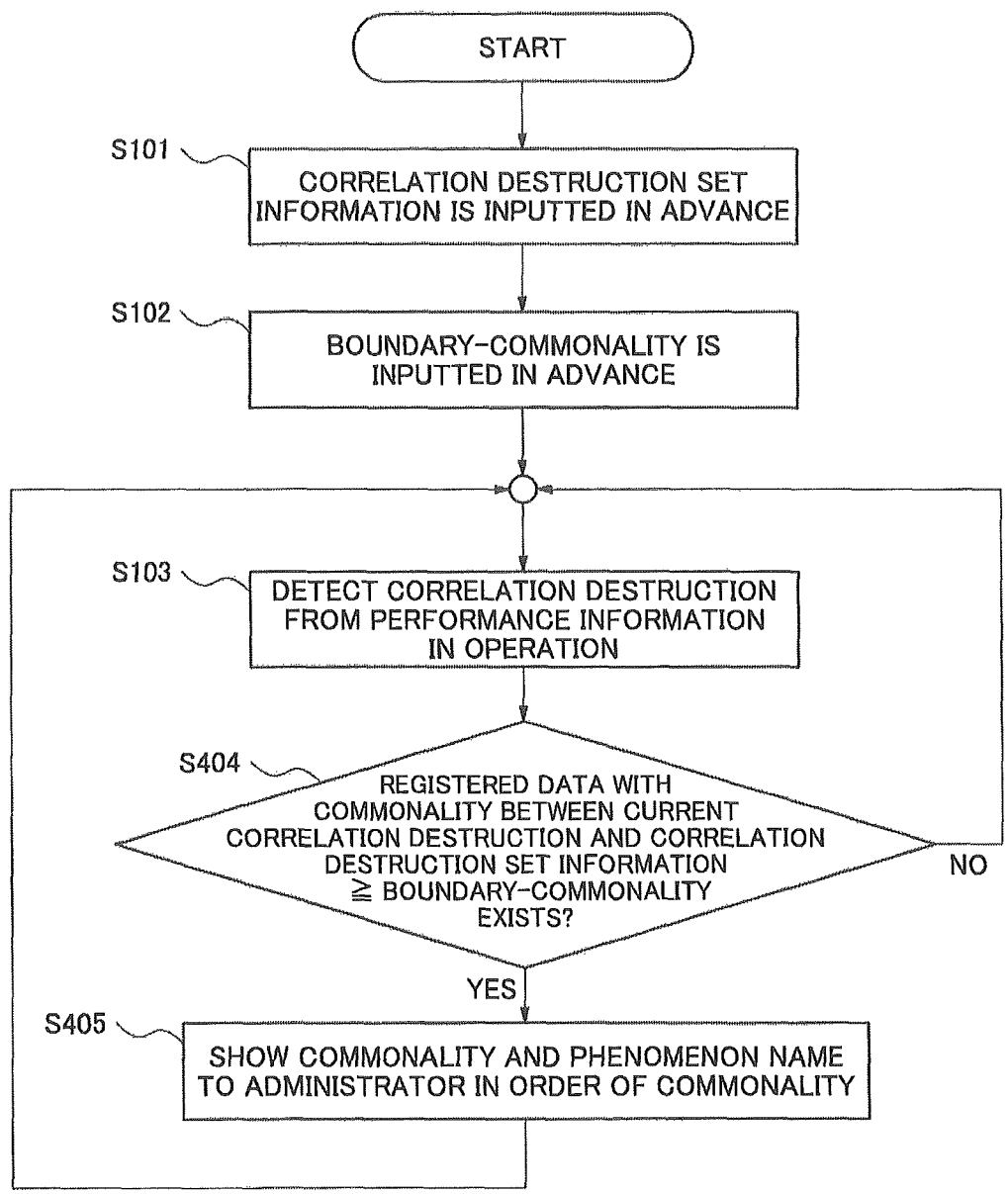
FIG. 11 A flow chart showing operation of prediction of an abnormality possible to occur based on destructed correlations, performed by the fault detection apparatus shown in FIG. 9 and FIG. 10.

FIG. 11 is a flow chart showing operation of prediction of an abnormality possible to occur based on destructed correlations, performed by the fault detection apparatus 310 shown in FIG. 9 and FIG. 10. In FIG. 11, identical reference numbers are given to the operation common to the operation according to the first exemplary embodiment shown in FIG. 7. Steps S101 to 103 are identical with the operation according to the first exemplary embodiment.

The correlation model comparison unit 325 compares the current destructed correlation detected in Step S103 with the destructed correlation list 33b for each of a plurality sets of the phenomenon name 33a, the destructed correlation list 33b, and the boundary-commonality 33c stored in the correlation destruction set information 33, and calculates the commonality using the equation shown in FIG. 1 mentioned above. The correlation model comparison unit 325 judges whether there exists a set (registered data) with the commonality being equal to or greater than the boundary-commonality 33c (Step S404).

When registered data with the calculated commonality being equal to or greater than the boundary-commonality 33c exists, the correlation model comparison unit 25 presents the phenomenon name 33a corresponding to the destructed correlation list 33b with the highest calculated commonality to the administrator via the administrator interaction unit 28 (Step S405). When there is no registered data with the calculated commonality being equal to or greater than the boundary-commonality 33c in Step S404, the processing is repeated from Step S103.

Figure 12:
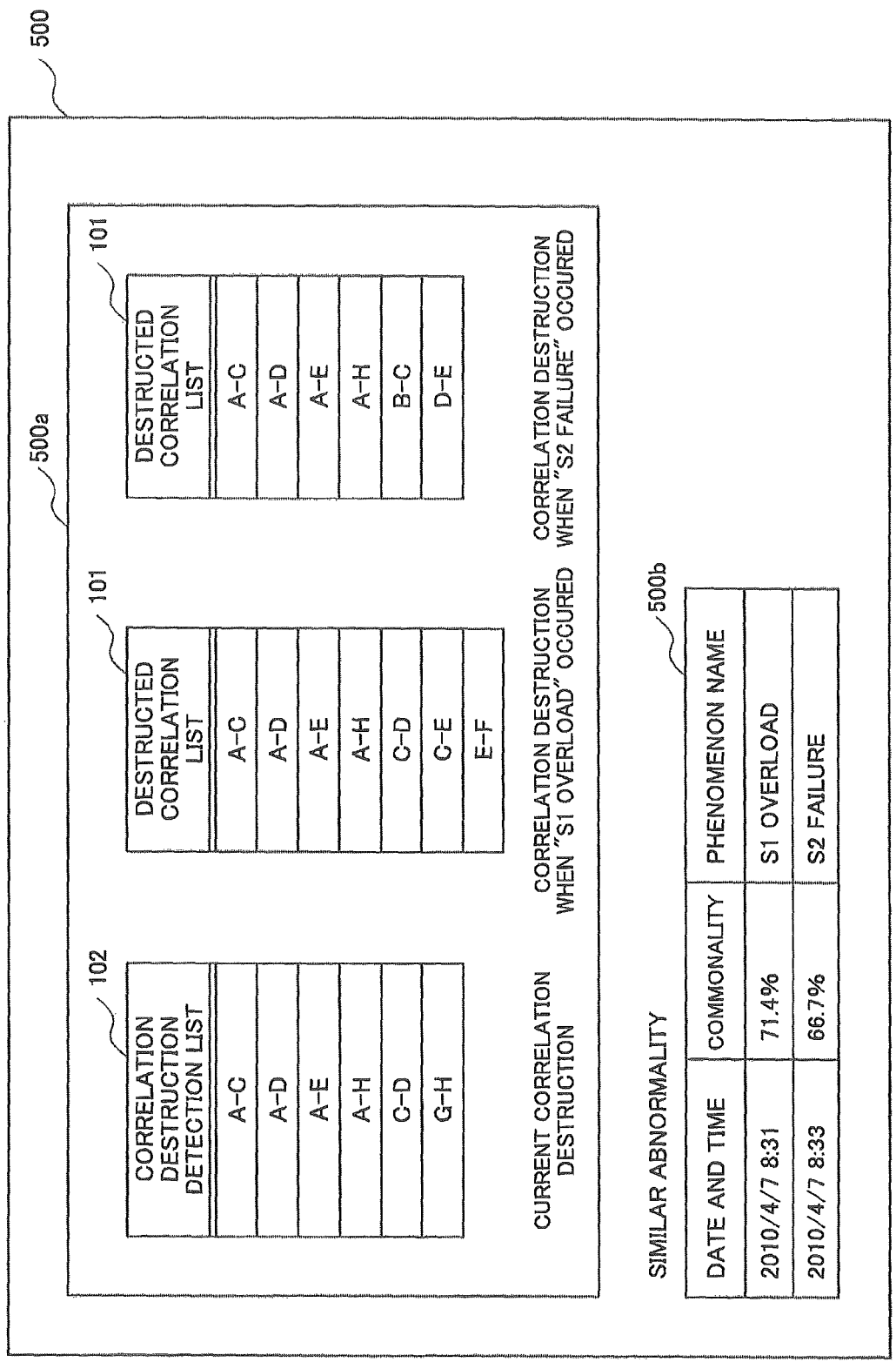
FIG. 12 An explanatory drawing showing an example of a display screen presented by an administrator interaction unit to an administrator, as a result of the processing shown in FIG. 11.

FIG. 12 is an explanatory drawing showing an example of a display screen 500 presented by the administrator interaction unit 28 to the administrator, as a result of the processing shown in FIG. 11. The display screen 500 includes a abnormal type display 500b which displays the phenomenon name 33a associated with the destructed correlation list 33b with the commonality being equal to or greater than the boundary-commonality 33c, in order from the highest commonality, and a comparison display 500a which displays the comparison of the correlation destruction status currently detected with the destructed correlation list 33b corresponding to the phenomenon name 33a displayed in the abnormal type display 500b.

Third Exemplary Embodiment

A fault detection apparatus 610 according to the third exemplary embodiment includes a correlation destruction set registration unit 626 in addition to the configuration of the fault detection apparatus 10 according to the first exemplary embodiment. The correlation destruction set registration unit 626 accepts an input of the phenomenon name which is currently occurring from the administrator for a list of element pairs for which the correlation analysis unit 24 has judged that the correlation is currently destructed (a list of correlations on which correlation destruction is detected), and stores the list of the element pairs (the list of the correlations) and the phenomenon name in association with each other, as the correlation destruction set information 33.

As a result, the third exemplary embodiment further has an effect that the registration of the correlation destruction set information regarding the fault which is actually occurring becomes easier, in addition to the effect by the first exemplary embodiment.

Hereinafter, this will be explained in more detail.

Figure 13:
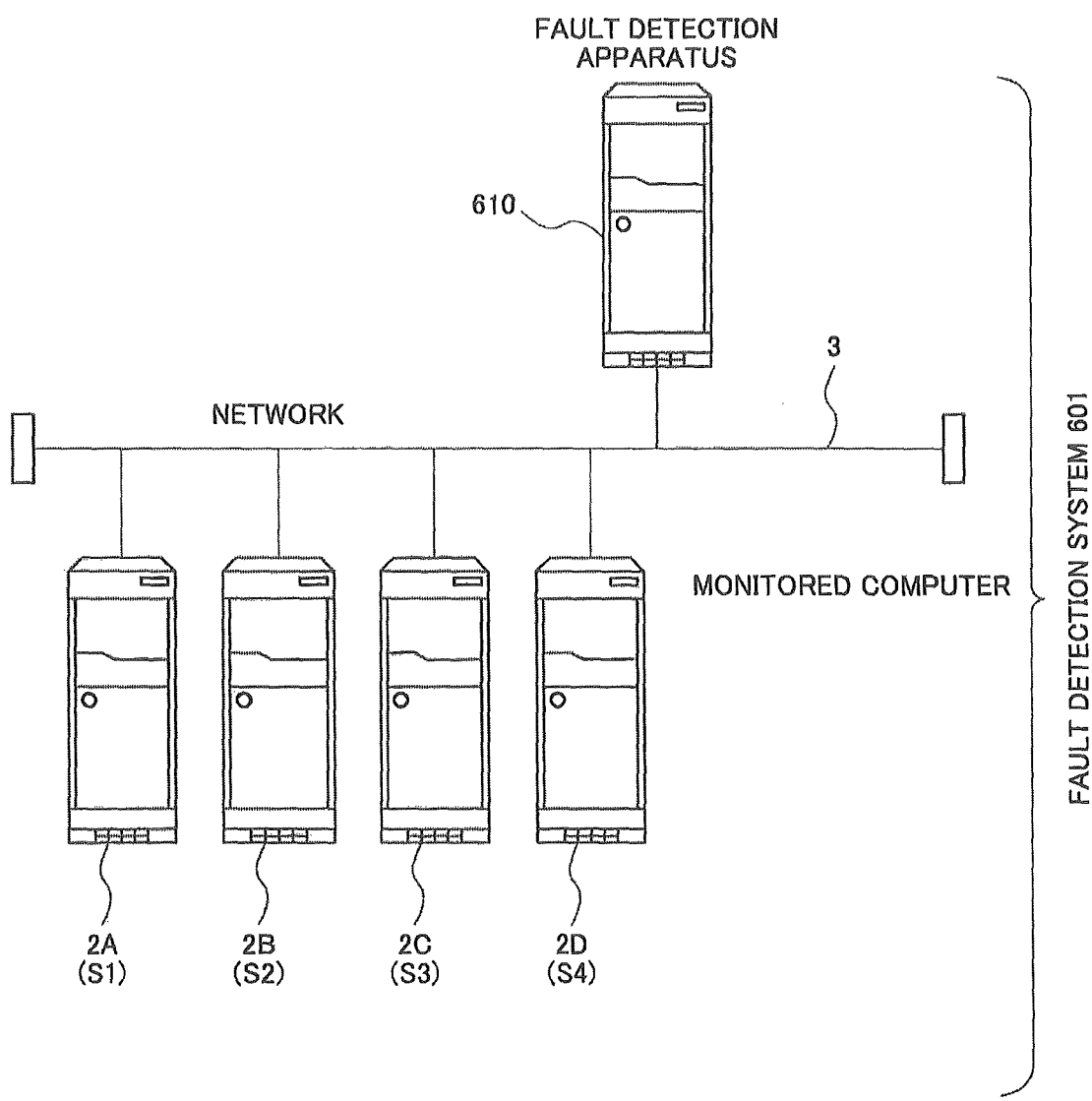
FIG. 13 An explanatory drawing showing an example of a schematic whole configuration of a fault cause extraction system including a fault detection apparatus according to a third exemplary embodiment of the present invention.

FIG. 13 is an explanatory drawing showing an example of a schematic whole configuration of a fault cause extraction system 601 including the fault detection apparatus 610 according to the third exemplary embodiment of the present invention. The fault cause extraction system 601 according to the third exemplary embodiment includes the monitored computers 2A, 2B, 2C, . . . which are a plurality of managed apparatuses and the fault detection apparatus 610 which manages the operation of these computers 2. They are connected via the network 3 so that they can communicate mutually. The monitored computers 2A, 2B, 2C, . . . are identical with the monitored computers 2 explained in the first exemplary embodiment. The fault detection apparatus 10 of the fault cause extraction system 1 according to the first exemplary embodiment is replaced with the fault detection apparatus 610.

Figure 14:
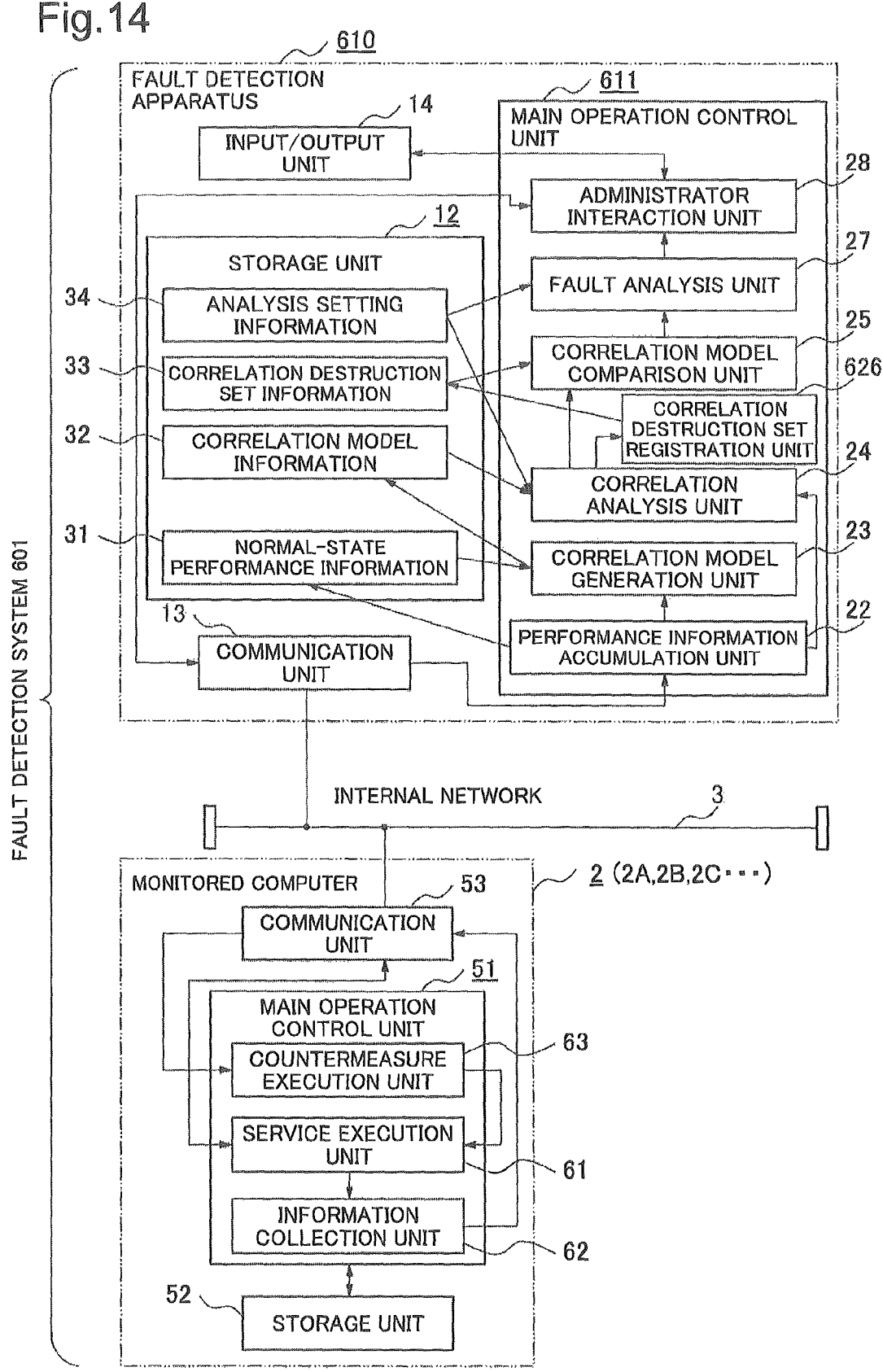
FIG. 14 An explanatory drawing showing a configuration of the fault detection apparatus shown in FIG. 13.
Figure 15:
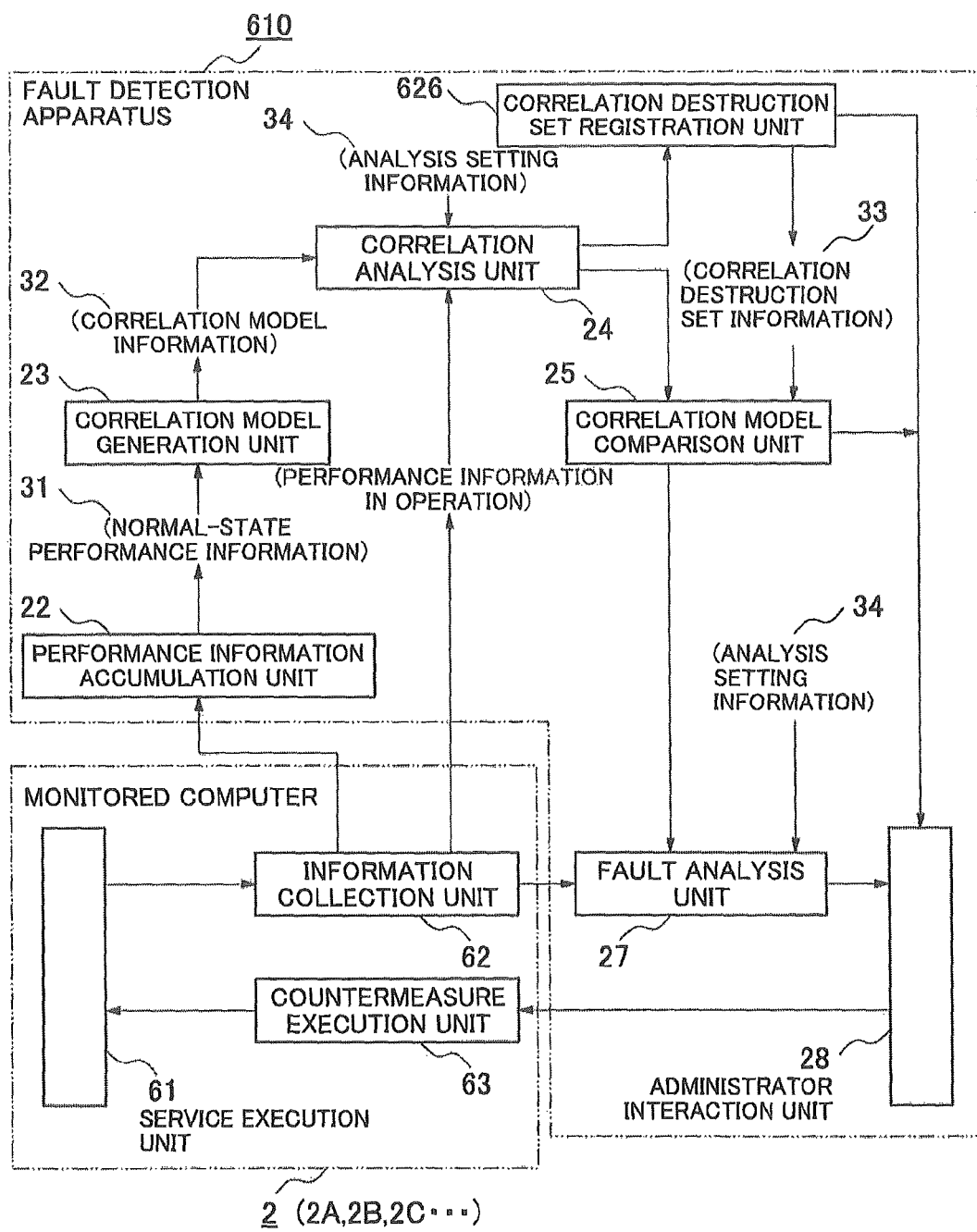
FIG. 15 An explanatory drawing showing a flow of processing of the fault detection apparatus shown in FIG. 14.

FIG. 14 is an explanatory drawing showing a configuration of the fault detection apparatus 610 shown in FIG. 13. FIG. 15 is an explanatory drawing showing a flow of processing of the fault detection apparatus 610 shown in FIG. 14. The configuration of the fault detection apparatus 610 according to the third exemplary embodiment of the present invention is identical with the fault detection apparatus 10 according to the first exemplary embodiment except that the correlation destruction set registration units 626 also operates in the main operation control unit 11.

The correlation destruction set registration unit 626 requests the administrator to input a phenomenon name and a boundary-commonality for the set of the correlation destruction detected by the correlation analysis unit 24 and regards the inputted content as the phenomenon name 33a and the boundary-commonality 33c respectively. The correlation destruction set registration unit 626 regards the set of the detected correlation destruction as the destructed correlation list 33b, and stores the destructed correlation list 33b, the phenomenon name 33a, and the boundary-commonality 33c, in association with each other, in the correlation destruction set information 33.

Figure 16:
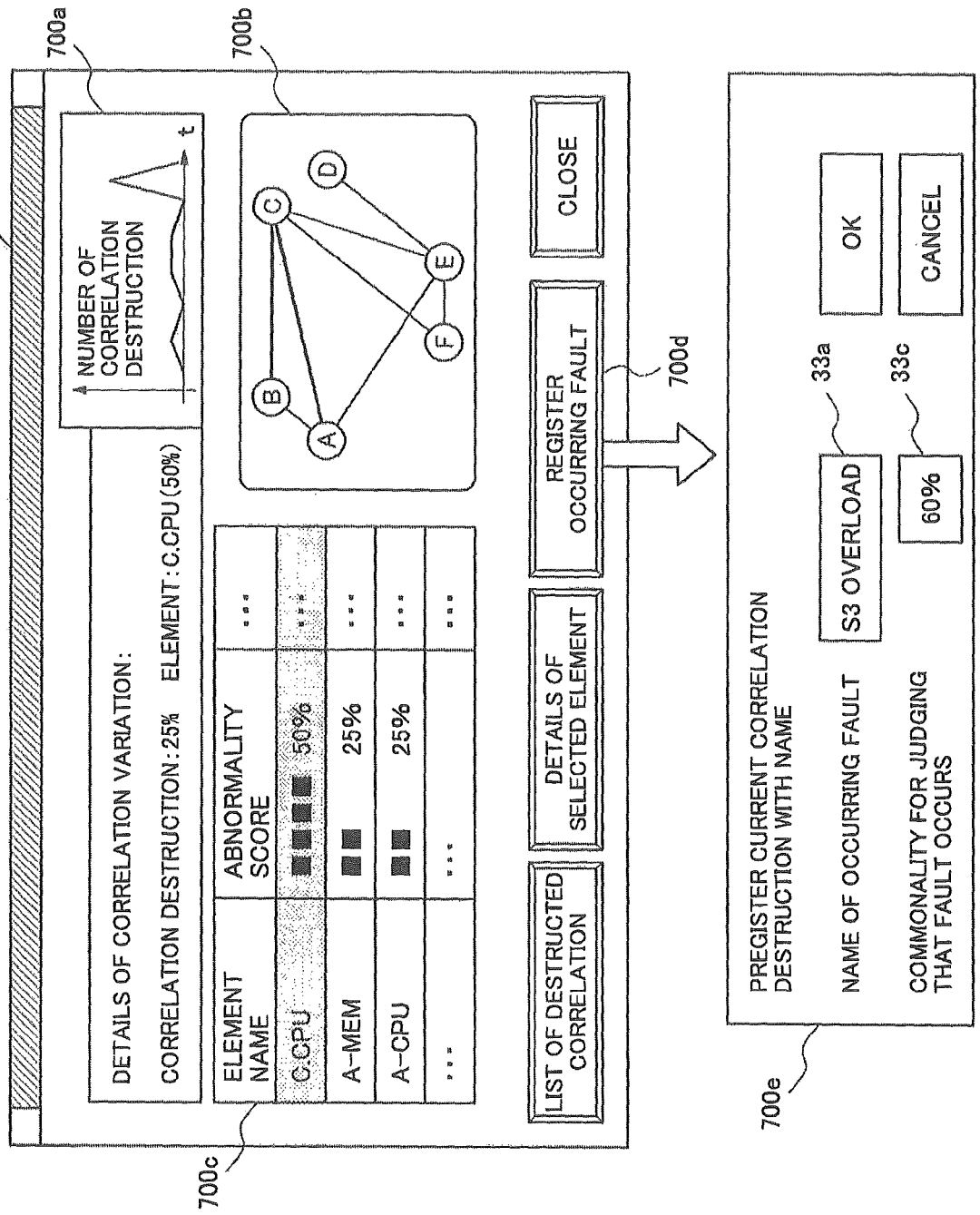
FIG. 16 An explanatory drawing showing content of a display screen presented by an administrator interaction unit to an administrator, in case correlation destruction is detected by the fault detection apparatus shown in FIG. 14.
Figure 17:
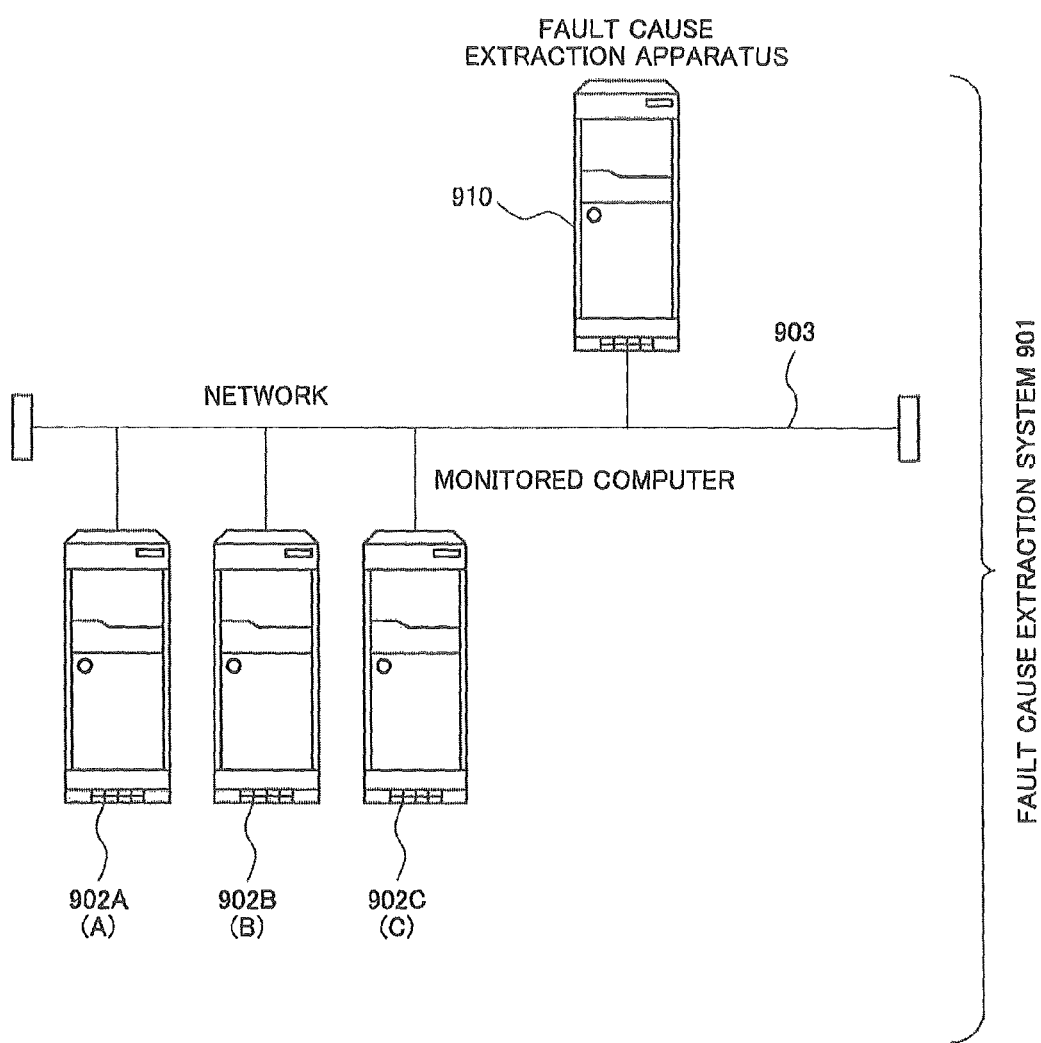
FIG. 17 An explanatory drawing showing an example of a schematic whole configuration of a fault cause extraction system including a fault cause extraction apparatus according to the technology described in patent literature 1.
Figure 18:
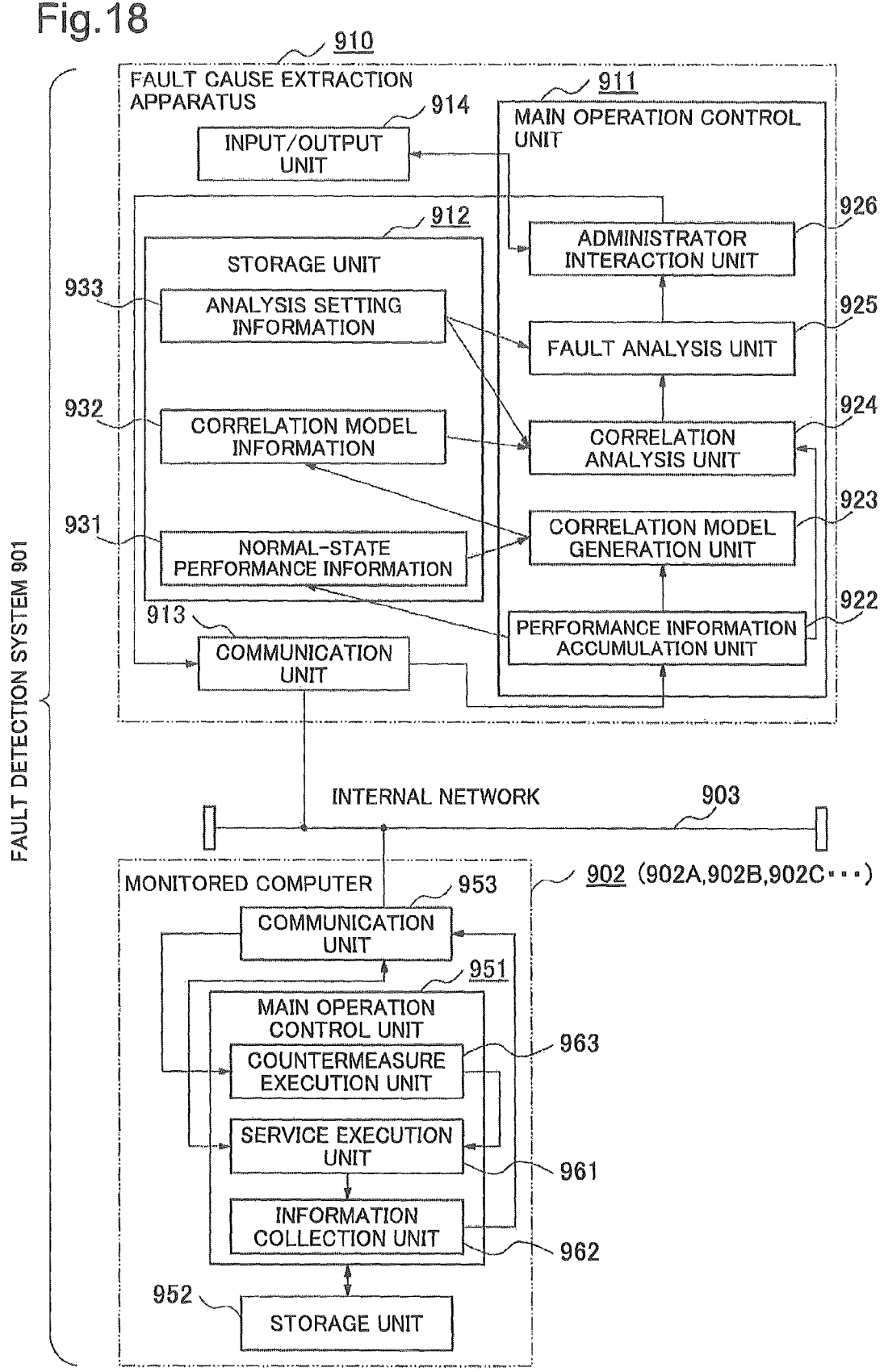
FIG. 18 An explanatory drawing showing a configuration of the fault cause extraction apparatus and the monitored computer shown in FIG. 17.
Figure 19:
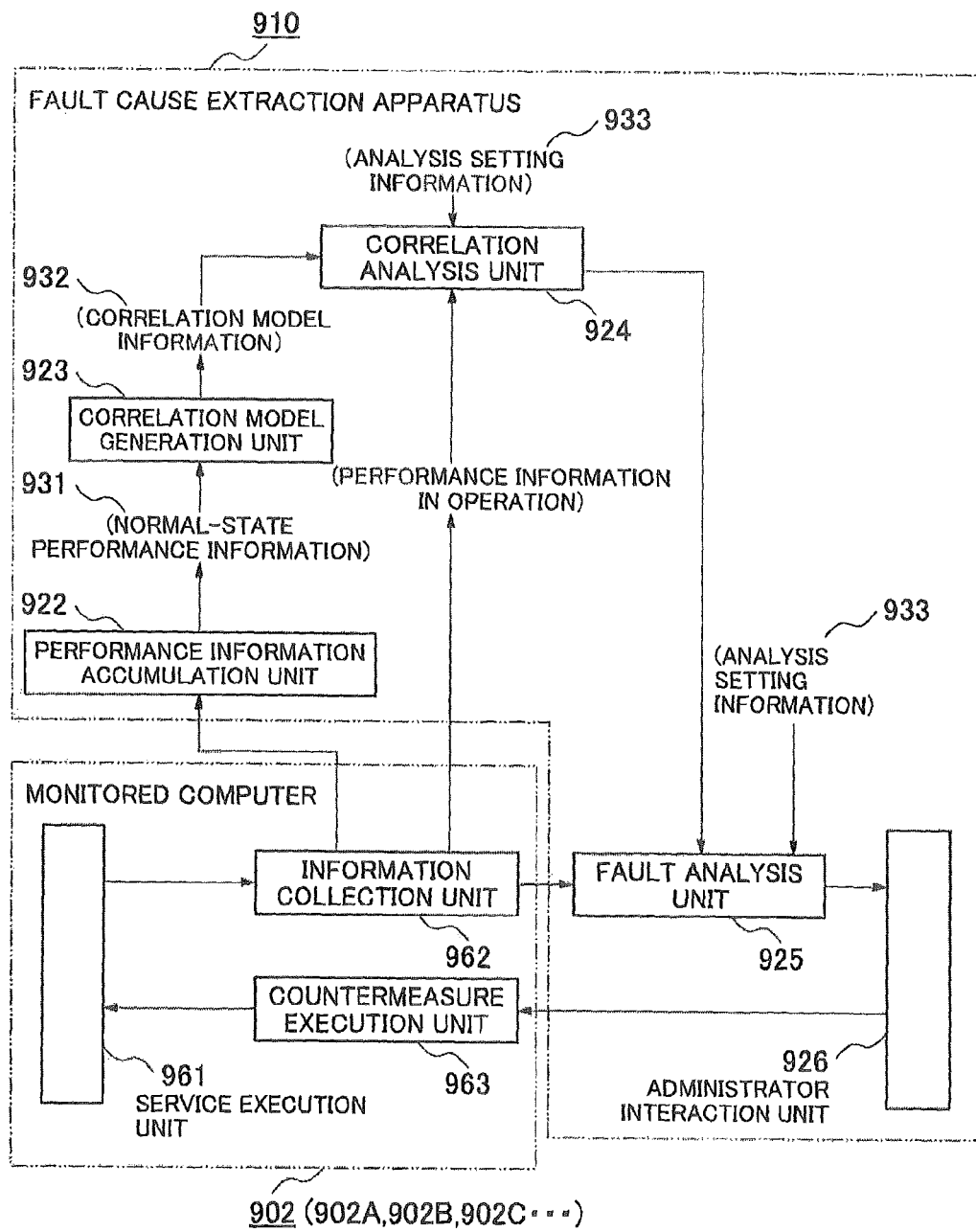
FIG. 19 An explanatory drawing showing a flow of processing of the fault cause extraction apparatus shown in FIG. 18.
Figure 22:
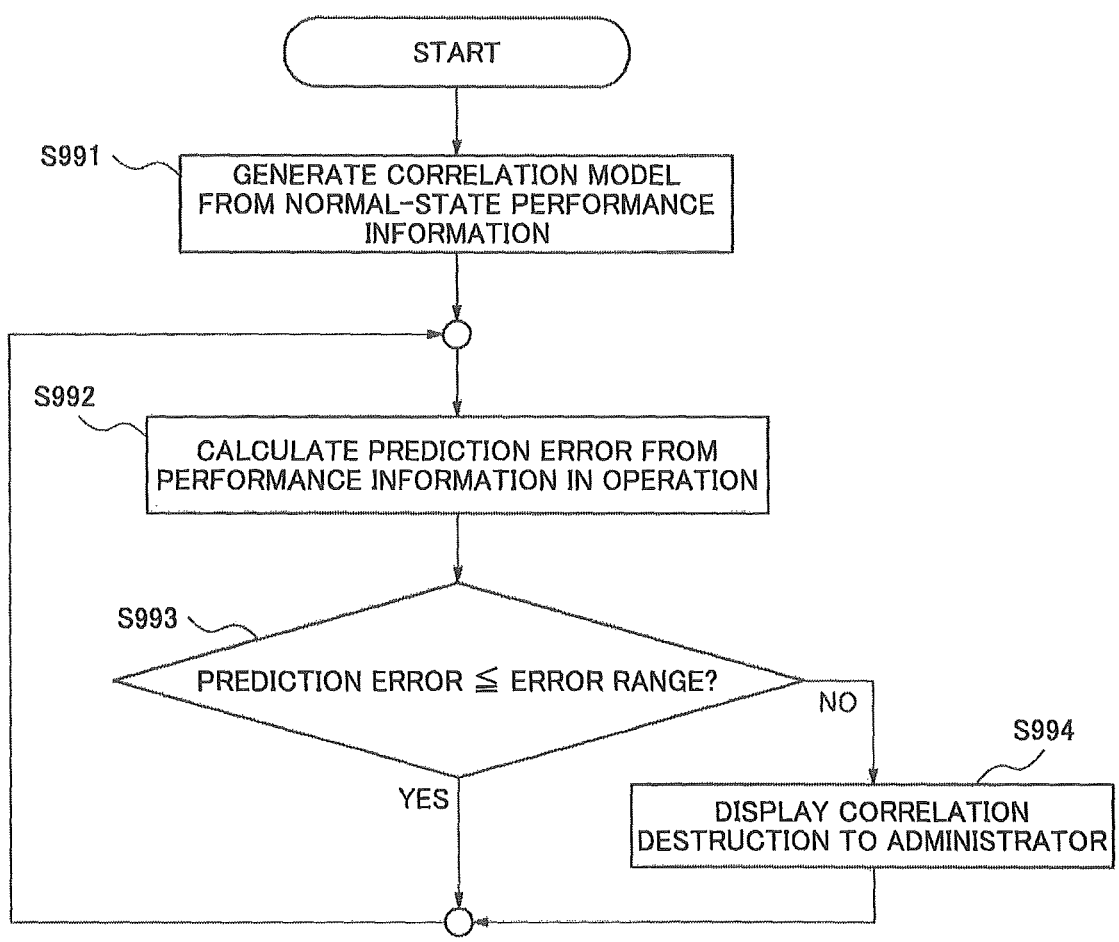
FIG. 22 A flow chart showing operation of a fault cause extraction performed by the fault cause extraction apparatus shown in FIG. 18.
Figure 23:
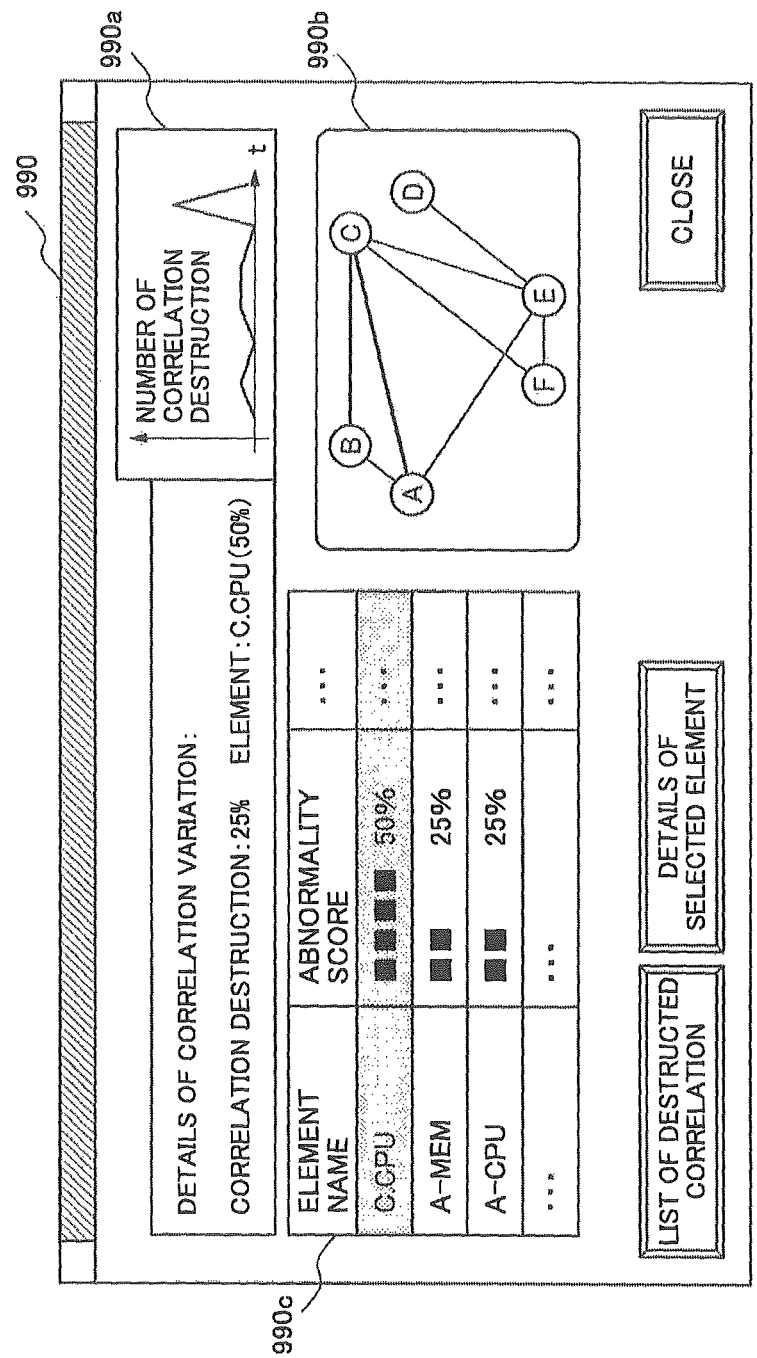
FIG. 23 An explanatory drawing showing content of a display screen presented to an administrator by an administrator interaction unit, based on the correlation model information shown in FIG. 21.

FIG. 16 is an explanatory drawing showing the content of a display screen 700 presented by the administrator interaction unit 28 to the administrator, in case correlation destruction is detected in the fault detection apparatus 610 shown in FIG. 14. This corresponds to the display screen 990, in the fault cause extraction apparatus 910 described in the background art, shown in FIG. 23. On the display screen 700, each of the number of correlation destruction 700a, a correlation graph 700b, and an abnormal element list 700c is displayed as well as on the display screen 990. In addition to these, a fault registration button 700d is provided.

When the administrator pushes this fault registration button 700d, a dialogue box 700e opens, and the administrator can input the phenomenon name 33a and the boundary-commonality 33c. The correlation destruction set registration unit 626 regards the set of the correlation destruction displayed as the correlation graph 700b as the destructed correlation list 33b, and registers the destructed correlation list 33b, the inputted phenomenon name 33a, and the boundary-commonality 33c, in association with each other, in the correlation destruction set information 33.

The operation which the correlation model comparison unit 25 performs using the registered correlation destruction set information 33 is identical with the fault detection apparatus 10 according to the first exemplary embodiment. Note that the correlation destruction set registration unit 626 may be added to the fault detection apparatus 310 according to the second exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-129842, filed on Jun. 7, 2010, the disclosure of which is incorporated herein in its entirety by reference.

INDUSTRIAL APPLICABILITY

The present invention is applicable to a computer network in general which provides an information and communications service.

REFERENCE SIGNS LIST 1, 301, 601 Fault detection system
2, 2A, 2B, 2C Monitored computer
3 Network
10, 310, 610 Fault detection apparatus
11, 51 Main operation control unit
12, 52 Storage unit
13, 53 Communication unit
14 Input/output unit
22 Performance information accumulation unit
23 Correlation model generation unit
24 Correlation analysis unit
25, 325 Correlation model comparison unit
27 Fault analysis unit
28 Administrator interaction unit
31 Normal-state performance information
32 Correlation model information
33 Correlation destruction set information
33a Phenomenon name
33b Destructed correlation list
33c Boundary-commonality
34 Analysis setting information
61 Service execution unit
62 Information collection unit
63 Countermeasure execution unit 101 Correlation model
200, 500, 700 Display screen
200a, 500a Comparison display
200b Commonality variation graph
200c, 500b Abnormal type display
625 Correlation destruction set registration unit
700a Number of correlation destruction
700b Correlation graph
700c Abnormal element list
700d Fault registration button
700e Dialogue box

What is claimed is:

1. A fault detection apparatus comprising:
a storage unit which stores correlation destruction set information which includes one or more correlations between different types of performance values among a plurality types of performance values of a system, and
a comparison unit which detects a set of common correlations between said one or more correlations included in said correlation destruction set information and one or more correlations on each of which correlation destruction is detected for inputted performance values.

2. The fault detection apparatus according to claim 1, wherein
said correlation destruction set information includes a fault name of a fault, and
said comparison unit outputs said fault name of said fault in case said set of common correlations are detected.

3. The fault detection apparatus according to claim 2 further comprising
a correlation destruction set registration unit which registers said one or more correlations on each of which correlation destruction is detected for said inputted performance values in association with said fault name when said fault name of said fault occurring in said system is inputted.

4. The fault detection apparatus according to claim 1, wherein
said correlation destruction set information includes one or more correlations on each of which correlation destruction was detected when a said fault occurred, in association with a fault name of each of a plurality of said faults, and
said comparison unit calculates, for each of said plurality of said faults, a commonality between said one or more correlations included in said correlation destruction set information and said one or more correlations on each of which correlation destruction is detected for said inputted performance values.

5. The fault detection apparatus according to claim 1, wherein said correlation destruction is detected when a fault occurs.

6. A fault detection method comprising:
storing correlation destruction set information which includes one or more correlations between different types of performance values among a plurality types of performance values of a system, and
detecting a set of common correlations between said one or more correlations included in said correlation destruction set information and one or more correlations on each of which correlation destruction is detected for inputted performance values.

7. The fault detection method according to claim 6, wherein
said correlation destruction set information includes a fault name of a fault, and
said detecting outputs said fault name of said fault in case said set of common correlations are detected.

8. The fault detection method according to claim 7 further comprising
registering said one or more correlations on each of which correlation destruction is detected for said inputted performance values in association with said fault name when said fault name of said fault occurring in said system is inputted.

9. The fault detection method according to claim 6, wherein
said correlation destruction set information includes one or more correlations on each of which correlation destruction was detected when a fault occurred, in association with a fault name of each of a plurality of said faults, and
said detecting calculates, for each of said plurality of said faults, a commonality between said one or more correlations included in said correlation destruction set information and said one or more correlations on each of which correlation destruction is detected for said inputted performance values.

* * * * *